United States Patent
Small et al.

(10) Patent No.: US 8,704,777 B2
(45) Date of Patent: Apr. 22, 2014

(54) DIGITAL DISPLAY DEVICES HAVING COMMUNICATION CAPABILITIES

(75) Inventors: Andrea Small, Bellevue, WA (US); Valerie Goulart, Seattle, WA (US); Joseph Ungari, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 882 days.

(21) Appl. No.: 12/358,195

(22) Filed: Jan. 22, 2009

(65) Prior Publication Data
US 2009/0256780 A1    Oct. 15, 2009

Related U.S. Application Data

(63) Continuation-in-part of application No. PCT/US2008/060123, filed on Apr. 11, 2008.

(51) Int. Cl.
*G06F 3/041*    (2006.01)
*G09G 5/00*    (2006.01)

(52) U.S. Cl.
USPC .......................................... 345/173; 345/1.3

(58) Field of Classification Search
None
See application file for complete search history.

(56) References Cited

U.S. PATENT DOCUMENTS

| | | | |
|---|---|---|---|
| 6,313,853 B1 | 11/2001 | Lamontagne et al. | |
| 6,630,941 B1 * | 10/2003 | Addison | 715/702 |
| 6,717,567 B1 | 4/2004 | Bowden, III et al. | |
| 6,961,046 B2 | 11/2005 | Bowden, III et al. | |
| 7,034,853 B2 * | 4/2006 | Cho et al. | 345/1.3 |
| 7,205,959 B2 | 4/2007 | Henriksson | |
| 7,263,382 B2 | 8/2007 | Chandhok et al. | |
| 7,404,001 B2 * | 7/2008 | Campbell et al. | 709/231 |
| 7,667,707 B1 * | 2/2010 | Margulis | 345/519 |
| 7,908,555 B2 | 3/2011 | Zellner | |
| 8,049,678 B2 * | 11/2011 | Lee et al. | 345/1.1 |
| 8,081,140 B2 * | 12/2011 | Jung | 345/1.1 |
| 2002/0039084 A1 | 4/2002 | Yamaguchi | |
| 2002/0071139 A1 | 6/2002 | Janik | |
| 2002/0126150 A1 | 9/2002 | Parry | |
| 2003/0020671 A1 * | 1/2003 | Santoro et al. | 345/1.3 |
| 2003/0128825 A1 * | 7/2003 | Loudermilk | 379/101.01 |
| 2004/0067768 A1 | 4/2004 | King et al. | |
| 2004/0174327 A1 | 9/2004 | Bowden et al. | |
| 2005/0012758 A1 | 1/2005 | Christou | |

(Continued)

OTHER PUBLICATIONS

"Rubik's TouchCube," http://rubikstouchcube.com [Last accessed: Feb. 24, 2009], 1 page.

(Continued)

*Primary Examiner* — Wayne Young
*Assistant Examiner* — Mark Fischer
(74) *Attorney, Agent, or Firm* — Perkins Coie LLP

(57) ABSTRACT

A digital display device having two or more displays that are coupled at angles to each other for displaying content associated with multiple sets of sources of content is described herein. Each display has one or more display regions in which content is displayed. A first display region on one display may be merged with a second display region on the same or a different display to form a merged display region in which content is displayed. The displays may be touch-sensitive. Display regions may be merged by, for example, receiving a first touch from a user of a first touch-sensitive display region and a second touch of a second touch-sensitive display region. In some embodiments, the digital display device has the form of a cube with six displays.

19 Claims, 16 Drawing Sheets

(56) References Cited

U.S. PATENT DOCUMENTS

| | | | |
|---|---|---|---|
| 2005/0117910 A1* | 6/2005 | Foote et al. | 398/106 |
| 2005/0204387 A1 | 9/2005 | Knudson et al. | |
| 2006/0164326 A1* | 7/2006 | Date | 345/1.3 |
| 2006/0271968 A1 | 11/2006 | Zellner | |
| 2008/0007481 A1 | 1/2008 | Chen et al. | |
| 2008/0066360 A1 | 3/2008 | Simon | |
| 2008/0146339 A1* | 6/2008 | Olsen et al. | 463/42 |
| 2008/0165082 A1* | 7/2008 | Manico et al. | 345/1.3 |
| 2008/0231544 A1* | 9/2008 | Cooper et al. | 345/1.1 |
| 2009/0046033 A1* | 2/2009 | Siegel | 345/1.3 |
| 2009/0082951 A1 | 3/2009 | Graessley | |
| 2011/0128242 A1 | 6/2011 | Carney et al. | |

OTHER PUBLICATIONS

International Search Report and Written Opinion, International Application No. PCT/2008/60123, Filed on Apr. 11, 2008, Applicant: T-Mobile USA, Inc., Date of Mailing: Jun. 30, 2008, 9 pages.

Pogue, David, "Slide Show Mounted in a Frame," http://www.nytimes.com, Feb. 7, 2008, 4 pages.

"Vizit User Guide," http://vizitme.com/PDFs/UserGuide.1.0.1.pdf [Last accessed: Jun. 17, 2010], 2009, 22 pages.

\* cited by examiner

DIGITAL DISPLAY DEVICES HAVING COMMUNICATION CAPABILITIES

CROSS-REFERENCE TO RELATED APPLICATIONS

This application is a continuation-in-part of International Application No. PCT/US08/60123, entitled "DIGITAL PICTURE FRAME HAVING COMMUNICATION CAPABILITIES," filed on Apr. 11, 2008.

BACKGROUND

Typically, digital photo frames display digital photos that are uploaded by a user via a memory card, Universal Serial Bus (USB) connection, or other method. However, one drawback to this approach is that it requires the user to have basic technological expertise in order to upload the digital photos to the digital photo frame. Because this approach requires a certain level of comfort with technology, some users may be dissuaded from utilizing digital photo frames. Accordingly, the need exists for digital photo frames that overcome the above limitations, in addition to providing other benefits.

DETAILED DESCRIPTION

Figure 1:
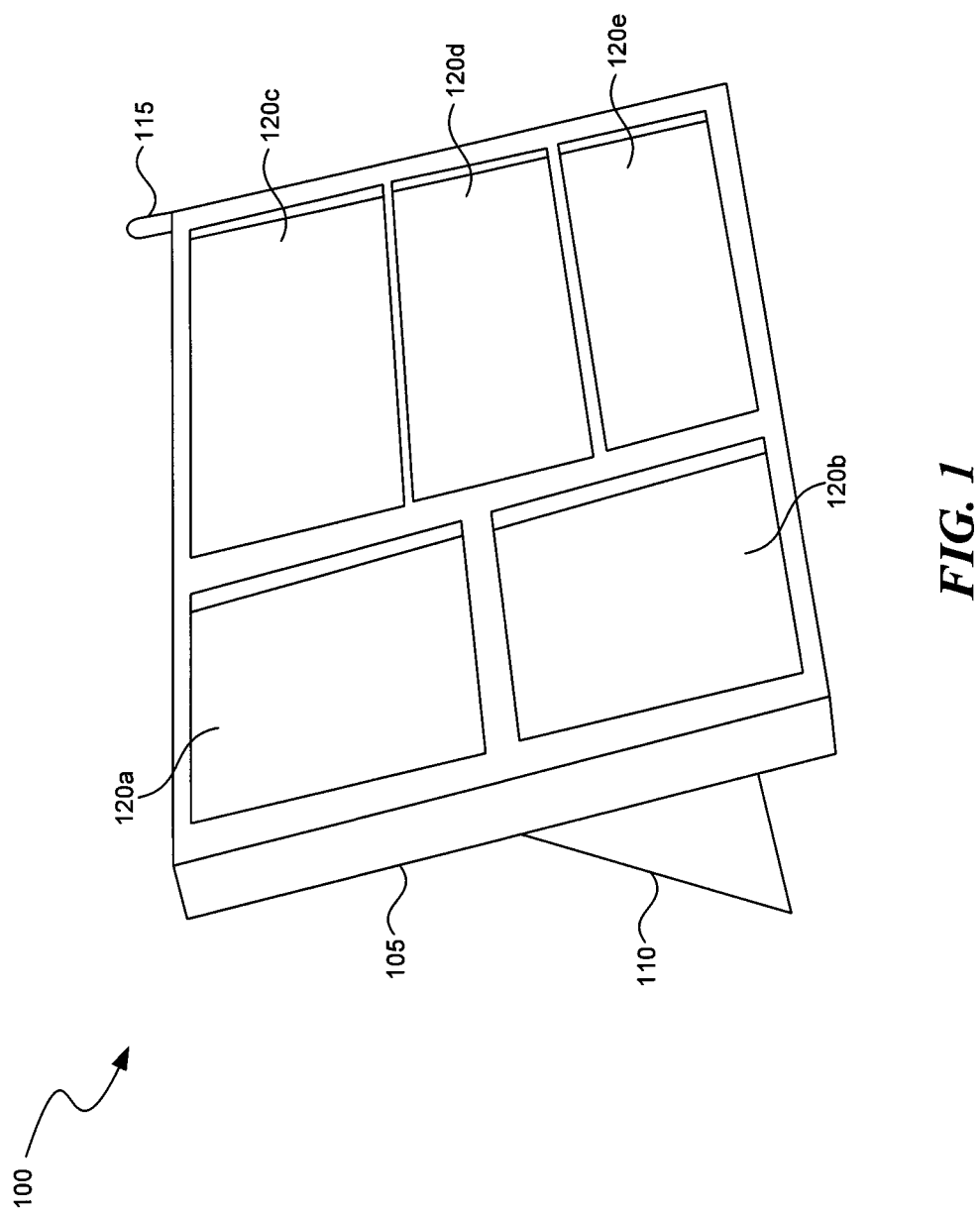
FIG. 1 is an isometric view of a digital display device having multiple display regions.

A digital display device for displaying content associated with multiple sets of sources of content is described herein. The digital display device includes a display configured to provide at least a first display region and a second display region. The digital display device further includes a communication component configured to transmit and receive signals to and from a telecommunications network and a storage component configured to store a mapping of sources of content to the first and second display regions. The digital display device also includes a routing component that automatically routes content associated with the first and second sets of sources for display on at least one of the first and second display regions. The first and second display regions display the content substantially simultaneously.

In some embodiments, the digital display device allows a user to engage in real-time communications with a source of content. The real time communication may be created with the source of content by selecting the display region that is displaying content that corresponds to the source of content. The digital display device establishes a real-time communication session with the corresponding source of content over the telecommunications network.

In some embodiments, the digital display device includes two or more displays that are coupled at angles to each other. For example, the digital display device may include three displays that are coupled to each other and may be arranged to form the shape of a triangle. As another example, the digital display device may include four displays that are coupled to each other and may be arranged to form the shape of a square. Each display is configured to provide one or more display regions in which content is displayed. The display regions may also be merged with one another to form a merged display region in which content is displayed. In some embodiments, the digital display device has the form of a cube with six faces. All or substantially all of the six faces may include a display having one or more display regions in which content is displayed. Two or more display regions may be merged with one-another to form a merged display region in which content is displayed. The displays may be touch-sensitive. Display regions may be merged by, for example, receiving a first touch from a user of a first touch-sensitive display region and a second touch of a second touch-sensitive display region.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

FIG. 1 is an isometric view of a digital display device 100 having multiple display regions that may be associated with sources of content. The digital display device 100 is supported by a stand 110 and includes a frame 105 and an antenna 115 attached to the frame 105. In some embodiments, the antenna 115 is embodied within the frame 105 such that it is not apparent to an observer, or the frame 105 is configured to act as an antenna. In some embodiments, in addition to or instead of the stand 110, the digital display device 100 includes a hanger configured to enable the digital display device 100 to be attached to a surface (e.g., a wall). The antenna 115 enables a wireless connection to a telecommunications network. In some embodiments, in addition to or in place of the antenna 115, the digital display device 100 includes components (not shown in FIG. 1) that enable a wired connection to a telecommunications network (e.g., an RJ-11 port, an Ethernet port, a cable modem port, or other wired port). The digital display device 100 also includes five display regions 120 (shown individually as display regions 120a-e). The digital display device 100 can include fewer than (e.g., one display region) or more than (e.g., six display regions) the depicted five display regions 120. The digital display device 100 can also have the display regions 120 arranged in configurations other than the configuration illustrated in FIG. 1. For example, the display regions can all have portrait orientations or can all have landscape orientations, or some combination of portrait and landscape orientations. As another example, the display regions may be positioned adjacent to one another in a linear fashion. The display regions 120 can also have varying sizes and shapes (e.g., circular, elliptical, square, rectangular, polygonal, etc.). Each display region may be constructed using an individual display panel, such as a liquid crystal display (LCD), an Organic Light-Emitting Diode (OLED) display, a Liquid Crystal On Silicon (LCOS) display, etc. Alternatively, each display region may be a mapped region of a single, larger display panel.

The digital display device 100 also includes communication components and/or circuits (not shown in FIG. 1) that enable the digital display device 100 to communicate by transmitting and receiving wireless signals using licensed, semi-licensed or unlicensed spectrum over a telecommunications network. Telecommunications networks include third-party telecommunications networks such as a Global System for Mobile (GSM) mobile telecommunications network, a code/time division multiple access (CDMA/TDMA) mobile telecommunications network, a 3rd Generation (3G) mobile telecommunications network (e.g. General Packet Radio Service (GPRS/EGPRS), Enhanced Data rates for GSM Evolution (EDGE), or Universal Mobile Telecommunications System (UMTS)), or other telecommunications network. For example, if the digital display device 100 is configured to communicate over a GSM mobile telecommunications network, the digital display device 100 may include a Subscriber Identity Module (SIM) card that stores an International Mobile Subscriber Identity (IMSI) number that can be used to identify the digital display device 100 on the GSM mobile telecommunications network. If the digital display device 100 is configured to communicate over another telecommunications network, the digital display device 100 may include other components that enable it to be identified on the other telecommunications network. Telecommunications networks also include local or home-based telecommunications networks, such as telecommunications networks using Generic Access Network (GAN) or Unlicensed/Universal Mobile Access (UMA) standards and protocols. In some embodiments, the digital display device 100 includes components that enable it to connect to a telecommunications network using the aforementioned GAN or UMA standards and protocols. For example, the digital display device 100 may include components that support Internet Protocol (IP)-based communication over a Wireless Local Area Network (WLAN) and components that enable communication with the telecommunications network over the IP-based WLAN.

Because the digital display device 100 is configured to communicate with a telecommunications network, the digital display device 100 incorporates an identifier that identifies it to the telecommunications network. Example identifiers include a telephone number, an IMSI, an e-mail address, an IP address, a Media Access Control (MAC) address, or other identifier. Because the digital display device 100 has an identifier assigned to it, the digital display device 100 can receive content that is sent to the identifier. As will be described in further detail with reference to e.g., FIGS. 5-6B, associations are created between each of the display regions 120 of the digital display device 100 and sources of content, either on a permanent basis or on a temporary basis. For example, display regions may be associated with sources used or operated by family members (e.g., children, grandchildren, etc.), friends, or colleagues. As another example, a display region may be associated with sources used or operated by a family or other group (e.g., a soccer team, a book club, etc.). As another example, the display regions may be temporarily mapped to respective sources, thereby enabling content from the sources to be displayed in alternating display regions. In some embodiments, the sources are used or operated by subscribers of the same telecommunications network to which the digital display device 100 is connected (e.g., the subscriber owns or utilizes a source device that connects to the same telecommunications network). The sources can send content (e.g., still photos or images, video clips, text messages, interactive video games, metadata associated with any of the foregoing or other types of content) to the identifier assigned to the digital display device 100. The content is transmitted over the telecommunications network to a transceiving site (such as a base station or wireless router) serving the digital display device 100. The digital display device 100 may store the content in a storage medium (not shown in FIG. 1) such as a hard disk, flash memory, memory card, etc., located in the digital display device, in an external device accessible via a WLAN, a network location or at a server location accessible via the Internet. Upon receiving the indicated content, the digital display device 100 automatically displays the content in the display region 120 that is permanently or temporarily associated with the source that sent it. The digital display device 100 displays the content in the different display regions 120 substantially simultaneously. In some embodiments, each time that content is received by the digital display device 100, the digital display device automatically displays the new content. In this way, the content displayed in the display regions 120 may be constantly refreshed. In some embodiments, the digital display device stores received content and successively displays the content on the display regions 120 (e.g., displays the stored content in slideshow fashion).

It will be appreciated that one advantage of the digital display device 100 is that it enables a user to enjoy new content associated with one or more sources without having to initiate the uploading of the new content. The digital display device 100 can therefore be successfully utilized by users with little or no technical expertise. Another advantage is that the user may enjoy content from a large number of sources at one time with a glance, in contrast to prior displays that require a user to wait while images are sequentially presented to the user.

Figure 2:
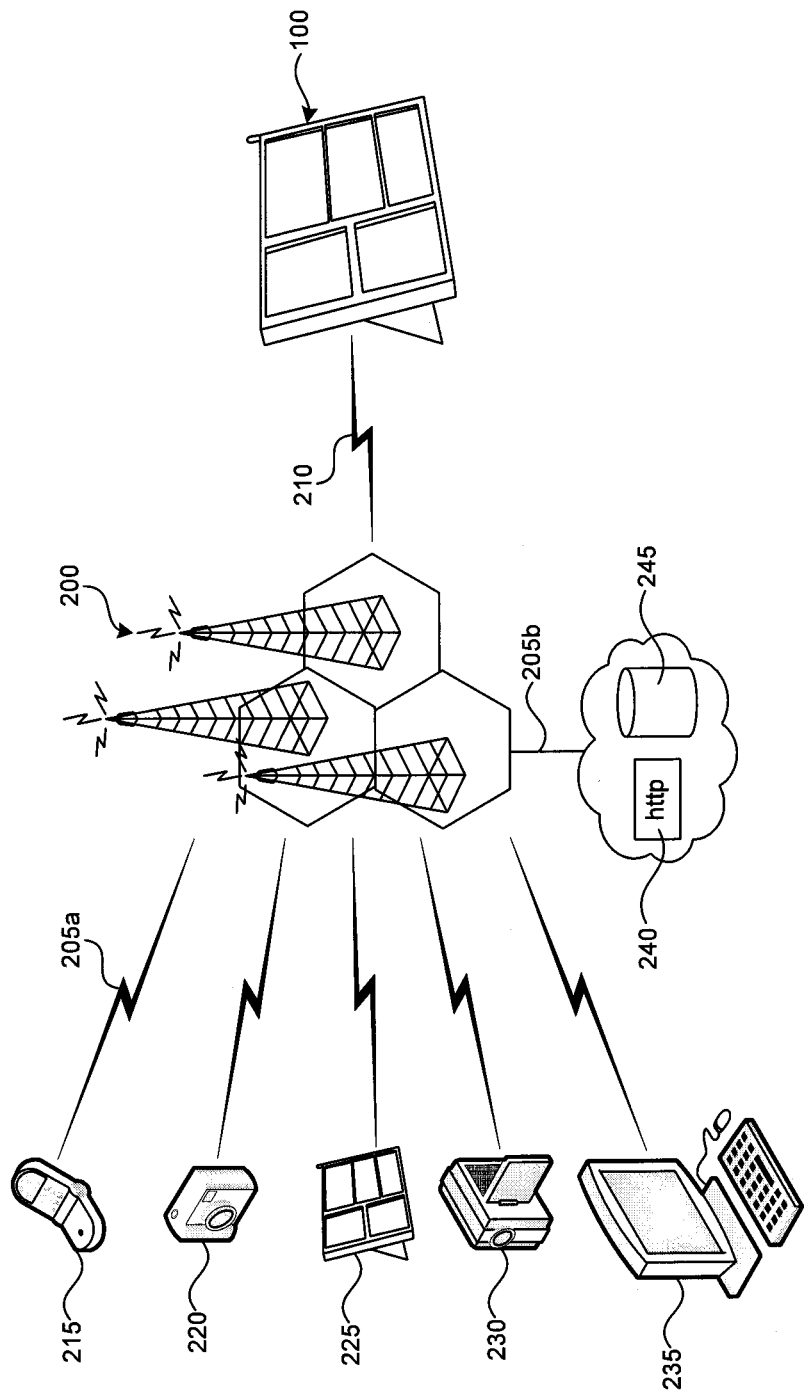
FIG. 2 illustrates a flow of content from various sources of content to the digital display device.

FIG. 2 illustrates a flow of content from various sources to the digital display device 100. Illustrated sources of content (i.e., content providers) include a mobile phone 215, a digital camera 220, another digital display device 225, a digital video camera 230, and a personal computer 235. Other types of sources may include websites 240 and online content repositories 245. The illustrated sources transmit content over a telecommunications network 200, which transmits the content via a wireless signal 210 to the digital display device 100. If a source is capable of sending content directly to the telecommunications network 200 (e.g., in the case of the source mobile phone 215), the content can be sent via a wireless connection 205a or wired connection 205b. Alternatively, if the source is utilizing a device that is capable of sending content indirectly to the telecommunications network 200 (e.g., a device that connects indirectly to the telecommunications network via a network such as the Internet), the content may be sent over a wired (or wireless, or partially wired, partially wireless) connection to the telecommunications network 200. For example, source personal computer 235 may connect to a website hosted by a computer that is part of the telecommunications network 200 and upload content to the website. The hosting computer can then provide the content or arrange to provide the content to the digital display device 100. As another example, source digital camera 220 may wirelessly connect to a wireless network, via which content can be transmitted to the telecommunications network 200. In some embodiments, the digital display device 100 can transmit and/or receive content using methods described in PCT/US08/54793 (entitled DATA EXCHANGE INITIATED BY TAPPING DEVICES), the entirety of which is hereby incorporated by reference. Those of skill in the art will understand that a source may be any of a variety of devices or applications that connect in a variety of ways to the telecommunications network 200, and that content from those sources can be ultimately conveyed to the digital display device 100.

Figure 3:
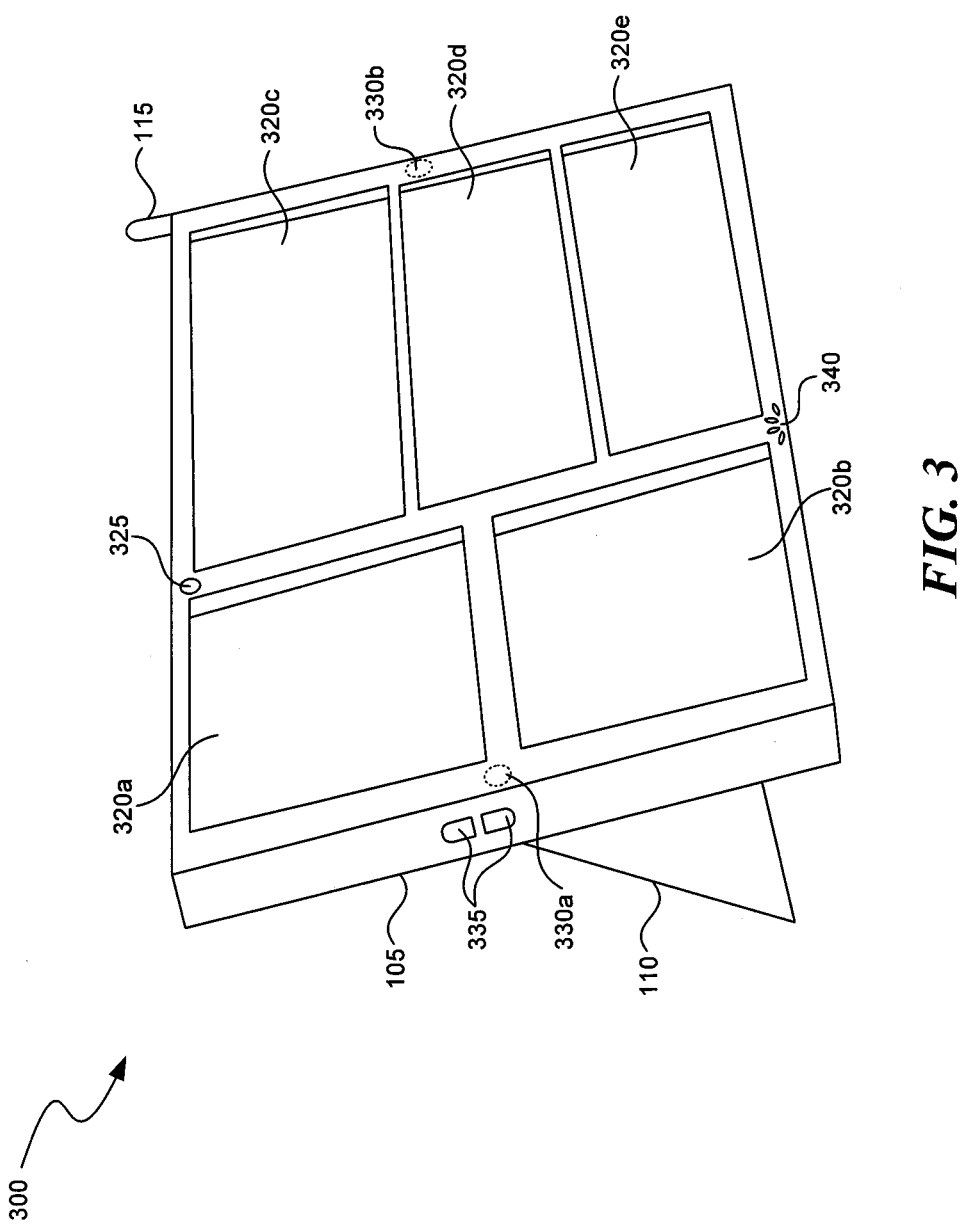
FIG. 3 is an isometric view of a digital display device having inbound and outbound communication channels.

FIG. 3 is an isometric view of a digital display device 300 configured in accordance with another embodiment of the invention. In addition to the illustrated components already discussed with reference to FIG. 1, the digital display device 300 includes audio output components 330 (shown individually as audio output components 330a and 330b). The audio output components are left and right stereo speakers that are configured to produce sound. The digital display device 300 also includes an audio input component 340 (e.g., a microphone) that is configured to receive sound. The digital display device 300 also includes touchscreen or touch-sensitive display regions 320 (shown individually as display regions 320a-e). The touch-sensitive display regions 320, when activated or actuated by a user (e.g., by touch), are configured to cause the digital display device 300 to initiate a real-time communication session with the source associated with the content that is displayed on the touch-sensitive display region 320 at the time the touch-sensitive display region 320 is touched. For example, if an image of an individual who uses or operates a source (e.g., a digital photograph of the individual) is displayed in a particular display region 320, the user can touch the particular display region 320 to cause the digital display device 300 to initiate a real-time communication session (such as a voice call, a video call, an e-mail, a text message, an instant messaging session or other communication) with that individual. For example, upon successfully reaching the individual after initiating a voice call, the user can speak into the audio input component 340 and hear the individual via sound generated by the audio output components 330. The user can adjust the volume of the sound generated by the audio output components 330 by utilizing up and down buttons 335 or via the touchscreen. When the user desires to end the call, the user can again activate or actuate the touch-sensitive display region to cause the digital display device 300 to end the initiated voice communication. In some embodiments, a display region is associated with a source or sources used or operated by multiple individuals. For example, a display region may be associated with a source used or operated by two individuals. The user can touch the display region associated with the source to initiate real-time communications with the individuals (e.g., three-way calling; a chat room session, an instant messaging session).

In some embodiments, while a user is engaged in a real-time communication with a first individual, the user can initiate a second real-time communication session with a second individual who uses or operates a second source, and conference the two individuals together into a group real-time communication session. For example, a user already engaged in a voice communication with a first individual can initiate a second voice communication by activating or actuating a second touch-sensitive display region at the time the second touch-sensitive display region is displaying content associated with the second source. When the second voice communication with the second individual is successfully initiated, the user can conference in the two individuals by again activating or actuating the first touch-sensitive display region associated with the first source. Alternatively, if the second voice communication is not successfully initiated, the user can return to the first voice communication by activating or actuating the second touch-sensitive display region, thus causing it to end and returning the user to the first voice communication. Additional participants to the conference call can be similarly added. Other types of group real time communications can similarly be initiated in this fashion (e.g., a video conferencing session, an instant messaging session, a text messaging session, a chat room session, etc.).

The digital display device 300 also includes a camera 325 that is configured to capture still or moving images for transmittal to the telecommunications network and ultimately to a remote recipient, and a button (not shown in FIG. 3) configured to activate the camera 325. For example, a user can position himself or herself in front of the camera 325 and activate the camera 325 (e.g., by pressing the button, utilizing a remote or otherwise successfully triggering the digital display device's functionality) to capture a still or moving image of himself or herself. The user can then touch a touch-screen display region 320 to send the captured image to the individual using or operating the source associated with the touch-screen display region 320. In some embodiments, the user can activate the camera 325 before or during an initiated real-time communication session and cause the digital display device 300 to transmit one or more still or moving images over the telecommunications network to a remote recipient. A user of the digital display device 300 can thus provide content to another user, such as another user of another digital display device.

Figure 4:
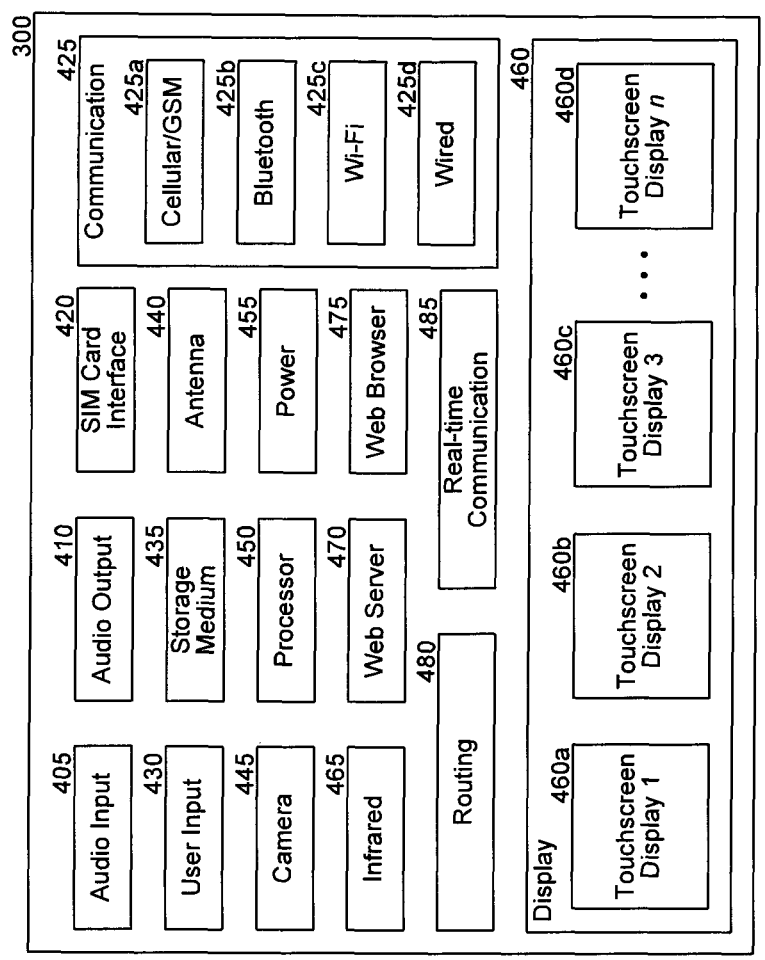
FIG. 4 is a schematic view of components of a digital display device having multiple display regions.

FIG. 4 is a schematic view of components of the digital display device 300 having multiple display regions. The digital display device 300 includes various components that enable it to provide the functionality described herein as well as additional functionality. These components include an audio input component 405 (e.g., microphone) and an audio output component 410 (e.g., speakers). A user input component 430 (e.g., buttons, alpha-numerical keyboard, etc.) enables the user to interact with the digital display device (e.g., adjust speaker volume, access stored content, adjust configuration settings, etc.). A camera component 445 (e.g., digital camera) captures images (e.g., still or moving images). A storage medium component 435 (e.g., hard drive, flash memory, memory card, etc.) stores content and other data (e.g., processing instructions, configuration settings, etc.). A processor 450 executes processing instructions. The digital display device 300 also may include a SIM card interface 420, which enables the digital display device 300 to receive a SIM card for purposes of accessing a GSM/GPRS/EDGE/UMTS telecommunications network, and an antenna 440 for transmitting and receiving wireless signals. The digital display device 300 also includes a power source 455 (e.g., batteries, AC/DC converter, etc.), a communication component 425, which may include a GSM/GPRS/EDGE/UMTS component 425a, a Bluetooth component 425b, a Wi-Fi component 425c and/or a wired component 425d (e.g., RJ-11 port, Ethernet port, etc.). The Bluetooth component 425b and/or the Wi-Fi component 425c enable the digital display device 300 to transmit and receive wireless signals in the 2.4 GHz Industrial Scientific Medical (ISM) band. Other wireless protocols (e.g., Mobile Broadband Wireless Access (MBWA), Ultra Wideband (UWB), ZigBee and other protocols) may also be supported. The digital display device 300 also includes an infrared component 465 that enables communication over an infrared spectrum (e.g., for communicating with a remote control that operates the digital display device 300). The digital display device 300 also includes a display component 460. The display component 460 may comprise one or several touchscreen liquid crystal displays 460 (shown individually as touchscreen displays 460a-n), each of which is associated with a display region. Alternatively, the digital display device may include a single touchscreen liquid crystal display that is mapped via software to provide the various display regions. The displays 460 display content associated with the display regions and are touch-activated to provide varied functionality. In addition to displaying content, the touchscreen displays 460 can display user interfaces (e.g. alphanumerical keyboard, buttons for selecting options, menus, etc.) that enable users to interact with the digital display device 300, either by using the touchscreen displays or by a remote. The digital display device also includes a routing component 480 that automatically routes received content to the appropriate display 460. The digital display device 300 also includes a real-time communication component 485 (e.g., hardware and/or software for audio and/or video communication, hardware and/or software for text messaging, instant messaging, or chat room messaging). In some embodiments, the digital display device 300 includes a web server component 470 that provides interfaces (such as those described with reference to FIGS. 6A and 6B) for interacting with the digital display device 300. The digital display device 300 may also include a browser component 475 that fetches or retrieves content over an HTTP connection or other supported protocol (e.g., File Transfer Protocol (FTP), Secure Shell (SSH), RSS feeds, etc.). The digital display device 300 can also include other components, circuits, chips, etc. that enable the digital display device 300 to provide the functionality described herein as well as additional functionality.

Figure 5:
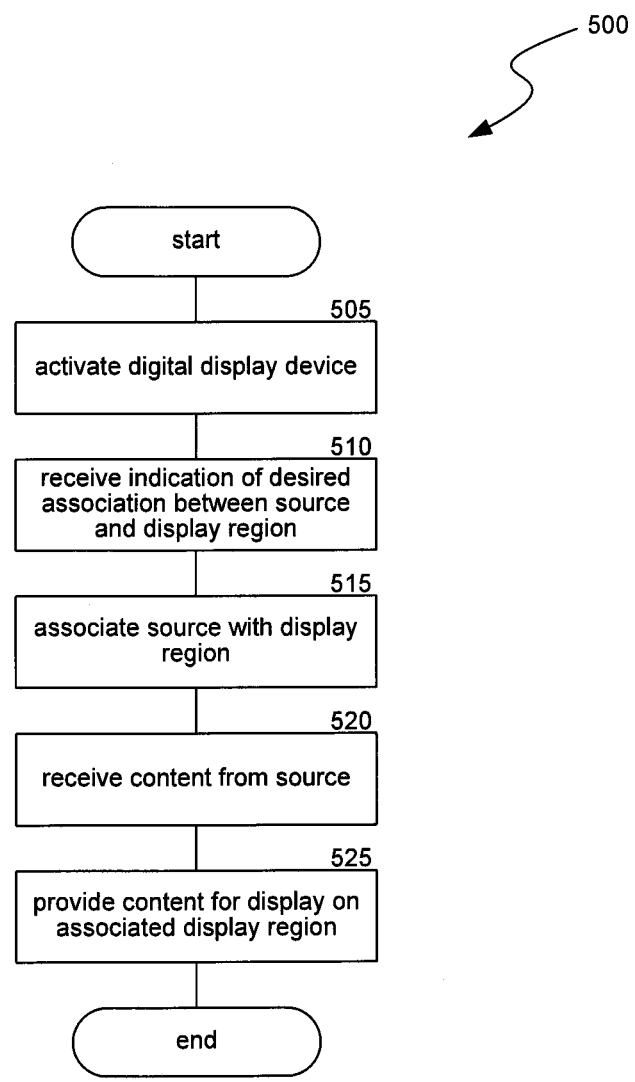
FIG. 5 is a flow diagram of a process for associating sources of content with display regions of a digital display device and providing content for display on associated display regions.

FIG. 5 is a flow diagram of a process 500 for associating sources with display regions of a digital display device and providing content from sources on associated display regions. At block 505, the digital display device is activated on a telecommunications network. The digital display device may be activated on a telecommunications network in any number of ways. For example, the digital display device may be activated by assigning it an additional identifier (e.g., a telephone number), or by marking as active a record in a database that is associated with the digital display device. In some embodiments, activation of the digital display device may be done at point-of-sale or prior to first use of the digital display device (e.g., the digital display device may have an identifier already assigned to it). In some embodiments, a user may activate the digital display device by accessing a website and providing an identifier to the website, which then activates the digital display device or causes it to be activated. At block 510 an indication of a desired association between a source of content and a display region of the digital display device is received from the user. For example, the user may indicate a desired association by accessing a website, identifying the user's digital display device, and assigning each of the display regions to a different source or group of sources used by an individual or group of individuals, by identifying the source(s) by their identifier(s). As another example, the user may indicate a desired association by using interfaces provided by the digital display device. At block 515 sources of content are associated with display regions of the digital display device.

Figure 6A:
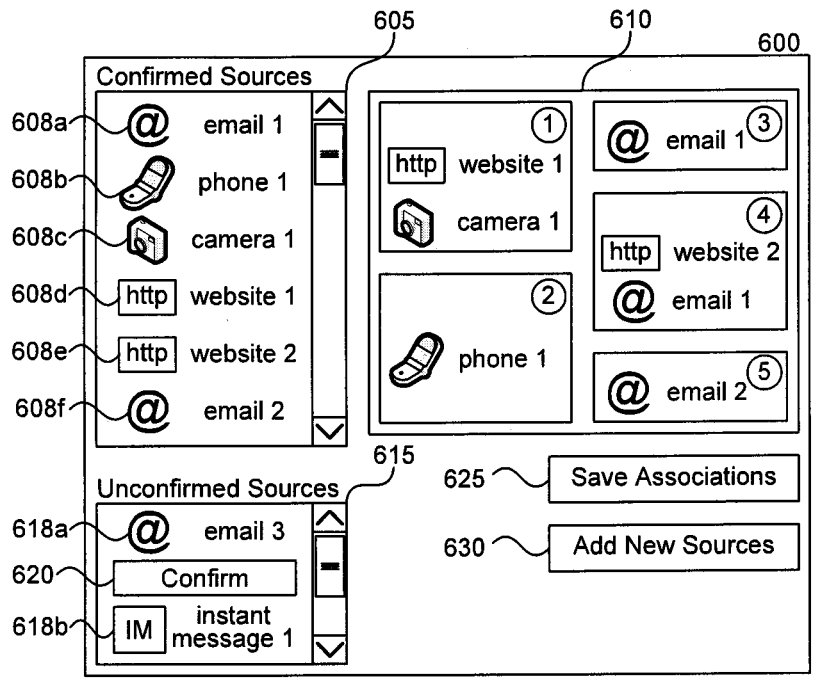
FIGS. 6A and 6B illustrate representative interfaces for creating associations between sources of content and display regions of a digital display device.
Figure 6B:
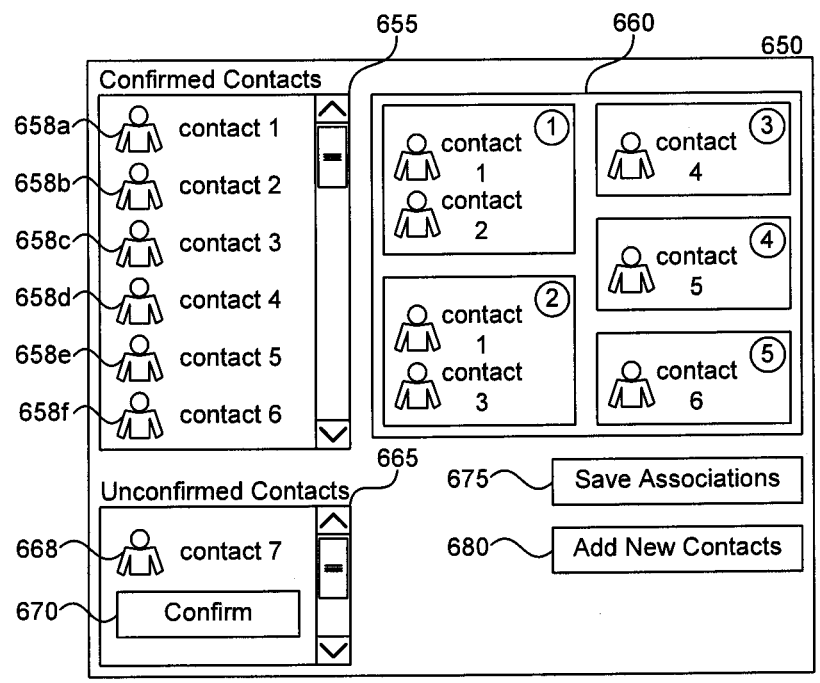

FIGS. 6A and 6B illustrate representative interfaces that enable a user to create associations between sources of content and display regions of a digital display device. FIG. 6A depicts an interface 600 that includes a confirmed sources region 605 displaying a number of sources 608 (shown individually as sources 608a-f). Each source 608 corresponds to a different actual source of content (e.g., a mobile phone, a digital camera, another digital display device, a digital video camera, a personal computer, a website, etc.). Each source 608 has an identifier (e.g., a telephone number, an IMSI, an e-mail address, an IP address, a MAC address, or other identifier) associated with it. For example, each of sources 608a and 608f can have an email address associated with it; source 608b can have a telephone number associated with it; and each of sources 608d and 608e can have a website address associated with it. The interface 600 also includes a digital display device region 610 which depicts the layout of the user's actual digital display device. The digital display device region 610 includes a number of display regions that are numbered 1-5. The numbered display regions correspond to the actual display regions of the user's digital display device. The user can create associations between a source 608 and a numbered display region by moving (e.g., dragging and dropping) the source 608 to the desired numbered display region. Alternatively, the user can move a numbered display region to the desired source or use some other method to create associations. As depicted, sources 608d and 608c are associated with numbered display region 1; source 608b is associated with numbered display region 2; source 608a is associated with numbered display region 3; sources 608e and 608a are associated with numbered display region 4; and source 608f is associated with numbered display region 5. More than one source 608 can be associated with a single numbered display region (as in the case of numbered display region 1) so as to enable the corresponding actual display region to display content from more than one source. Furthermore, a source 608 can be associated with more than one numbered display region (as in the case of source 608a, which is associated with numbered display regions 3 and 4) so as to enable the content from the source 608 to be displayed on more than one corresponding actual display region (e.g., the content from the source 608 can be rotated or moved amongst the corresponding actual display regions). Creating associations in this way allows the user to specify the display region to which content from an individual source should be sent. Therefore, the interface 600 enables the user to have granular control over associations between sources of content and actual display regions.

The interface 600 also includes an unconfirmed sources region 615 displaying a number of unconfirmed sources 618 (shown individually as unconfirmed sources 618a and 618b). The user may be required to confirm unconfirmed sources 618 before the content from these unconfirmed sources 618 can be associated with the numbered display regions. Requiring the user to confirm unconfirmed sources thus prevents unconfirmed sources from having their associated content automatically displayed on the user's actual digital display device. The user can add new sources of content by selecting the "Add New Sources" button 630, which can display a new interface (not shown) for adding new sources of content.

FIG. 6B depicts another interface 650 that enables the user to create associations between contacts and display regions of the digital display device. The interface 650 includes a confirmed contacts region 655 displaying a number of contacts 658 (shown individually as contacts 658*a-f*). Each of the contacts 658 corresponds to an actual individual person. Each individual person may have one or more sources of content (e.g., a mobile phone, an email address, a digital camera, a website, a personal computer, etc., none of which are shown in FIG. 6B) associated with him or her. The interface 650 allows the user to associate all of (or some subset of) the sources of content associated with an individual with one or more display regions of the digital display device. Similar to the interface depicted in FIG. 6A, the interface 650 includes a digital display device region 660 which depicts the layout of the user's actual digital display device. The digital display device region 660 includes a number of display regions that are numbered 1-5. The numbered display regions correspond to the actual display regions of the user's digital display device. The user can create associations between a contact 658 and a numbered display region by moving (e.g., dragging and dropping) the contact 658 to the desired numbered display region. Alternatively, the user can move a numbered display region to the desired contact or use some other method to create associations. As depicted, contacts 658*a* and 658*b* are associated with numbered display region 1; contacts 658*a* and 658*c* are associated with numbered display region 2; contact 658*d* is associated with numbered display region 3; contact 658*e* is associated with numbered display region 4; and contact 658*f* is associated with numbered display region 5. More than one contact 658 can be associated with a single numbered display region (as in the case of numbered display regions 1 and 2) so as to enable the corresponding actual display region to display content from the sources of more than one contact. Furthermore, a contact 658 can be associated with more than one numbered display region (as in the case of contact 658*a*, which is associated with numbered display regions 1 and 2) so as to enable the content from the sources of the contact 658 to be displayed on more than one corresponding actual display region (e.g., the content from the sources of the contact 658 can be rotated or moved amongst the corresponding actual display regions). Creating associations in this way associates all of the sources of content associated with the individual (or just some subset of all of the sources of content can be associated with the individual) with one or more digital display regions. For example, contact 658*e* corresponds to an actual individual who may own, operate or use the following sources of content: a mobile phone, an email address, and a website. Each of the mobile phone, the email address, and the website, by virtue of contact 658*e*'s association with numbered display region 3, is now a source of content for the corresponding actual display region on the user's digital display device. Therefore, the interface 650 enables the user to associate all of the sources of content associated with an individual with an actual display region, which can be desirable if the user wishes to segregate the display regions on the digital display device on an individual basis.

The interface 650 also includes an unconfirmed contacts region 665 displaying one or more unconfirmed contacts 668. The user may be required to confirm unconfirmed contacts 668 before the content from the sources of these unconfirmed contacts 668 may be associated with the numbered display regions. The user can add new contacts by selecting the "Add New Contacts" button 680, which can display a new interface (not shown) for adding new contacts and their sources of content.

The interfaces 600 and 650 are not mutually exclusive and could be combined to allow the user to create associations between individuals and actual display regions while still allowing granular control on a source basis. For example, the user could create associations on an individual basis using the interface 650. The user could then expand the contacts 658 to show the sources associated with each contact 658, and then delete sources or move sources amongst the different numbered display regions. Those of skill in the art will understand that other methods of creating associations between sources of content and actual display regions are possible.

Returning to FIG. 5, at block 520 content is received from one or more of the sources associated with the different display regions. Some sources of content can be considered to be "pull" sources of content and others to be "push" sources of content. For example, referring back to FIGS. 6A and 6B, website sources 608*d* and 608*e* can be considered to be "pull" sources in that website content (e.g., photos, videos, etc.) is usually (although not necessarily) "pulled" or downloaded from websites. As another example, email sources 608*a* and 608*f* can be considered to be "push" sources in that email content (e.g., text, photos, etc.) is usually (although not necessarily) "pushed" or sent from senders of emails to recipients of emails. After the user has saved the associations between the sources 608 and the numbered display regions (which can be done by selecting "Save Associations" button 625 or button 675), a notification that includes an identifier of the digital display device can be sent to "push" sources of content so as to enable the push sources of content to send content to the digital display device. For example, an email can be sent to email sources 608*a* and 608*f* to notify the email sources of the identifier (e.g., an email address) of the digital display device to which content can be sent. As another example, a text message can be sent to phone source 608*b* to notify the phone source 608*b* of an identifier (e.g., a telephone number) of the digital display device to which content can be sent. In some embodiments, each source is provided with the same identifier for the digital display device. In this case, the source of the content is determined by the source's identifier, and the content can thus be appropriately routed. In some embodiments, each source is provided with a different identifier for the digital display device. In this case, content that the source sends to the identifier can be recognized as coming from the source, and the content can thus be appropriately routed. Content can also be "pulled" from "pull" sources of content such as website sources 608*d* and 608*e*, on a periodic, ad-hoc or other basis. Content can then be appropriately routed to the proper actual display region based upon the associations created using the interfaces 600 and/or 650. It is of course possible for sources of content to be both "pull" and "push" sources. For these sources, either or both of the above methods can be used to obtain content. Those of skill in the art will understand that other methods of determining sources of content and routing the content to the actual display regions are possible.

Returning to FIG. 5, at block 525 the content is provided for display on the appropriate display regions. The digital display device can automatically display the content upon receipt substantially simultaneously in the appropriate different display regions. In some embodiments, the digital display device buffers received content by storing it in a storage medium before displaying the content. In some embodiments, the digital display device displays content in a slideshow fashion.

One skilled in the art will appreciate that the steps described above in the process 500 may be performed in an order other than the order described, and that additional or fewer steps may be performed. For example, an association between a source and a display region may be created when content is first received by the digital display device. One skilled in the art will also appreciate that the process 500 may be implemented by a server associated with the telecommunications network (e.g., an activation server) or by the digital display device itself, and/or that the interfaces 600 and 650 may be provided by a server associated with the telecommunications network (e.g., a web server) or by the digital display device itself. In some embodiments, one or more servers associated with the telecommunications network may implement the process 500, provide the interfaces 600 and 650, and store the data received via these interfaces. In these embodiments, the one or more servers associated with the telecommunications network act as intermediaries between the sources of content and the digital display device. In some embodiments, the digital display device implements the process 500, provide the interfaces 600 and/or 650 (e.g., by its embedded web server), and stores the data received via these interfaces (e.g., in its storage medium). For example, the digital display device can display in each of the display regions an alphanumerical keyboard that the user can use to input identifiers identifying sources and/or to create associations.

Figure 7A:
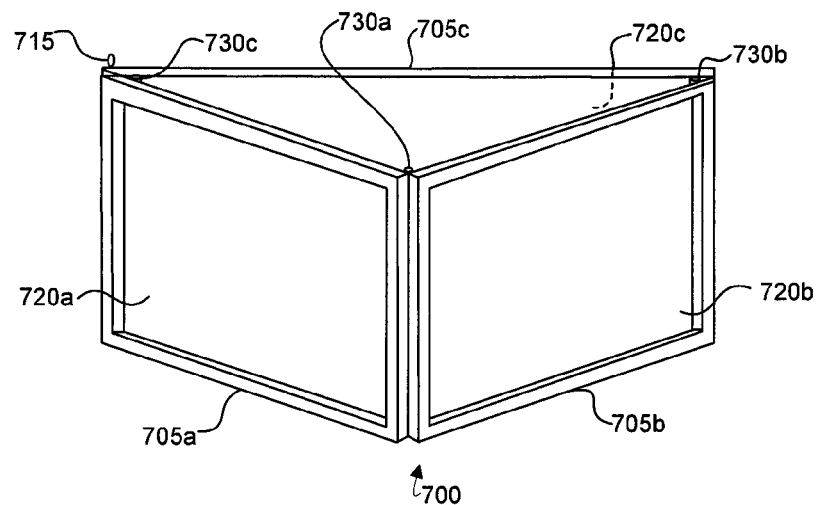
FIG. 7A is an isometric view of a digital display device having three distinct displays that may be coupled to each other.

FIG. 7A is an isometric view of a digital display device 700 having three distinct displays. The digital display device 700 includes three distinct frames, labeled as frame 705a, frame 705b and frame 705c. Frame 705a is coupled to (i.e., attached to) frame 705b by a hinge 730a, frame 705b is coupled to frame 705c by a hinge 730b, and frame 705c is coupled to frame 705a by a hinge 730c. Means other than the hinges 730 (e.g., magnetic attachments, connectors, etc.) may also be used to couple the frames 705 to each other. Accordingly, when the frames are appropriately moved with respect to each other around the hinge axes the digital display device 700 may assume a generally triangular configuration when viewed from above or below it. Each frame 705 includes a display: frame 705a includes a display 720a, frame 705b includes a display 720b, and frame 705c includes a display 720c. Each display 720 may include one or more distinct display regions that may be associated with sources of content as described herein. The digital display device 700 also includes an antenna 715 coupled to, or carried by, the frame 705c that enables a wireless connection to a telecommunications network. The hinges 730 may be such that a frame 705 may be decoupled from, or detached from, another frame 705 to which it is coupled. For example, hinge 730c may permit frame 705a to be detached from frame 705c. In a state where one frame 705 is detached from another frame 705, the hinges 730 also permit the frames 705 that are still coupled to each other to move relative to each other.

Figure 7B:
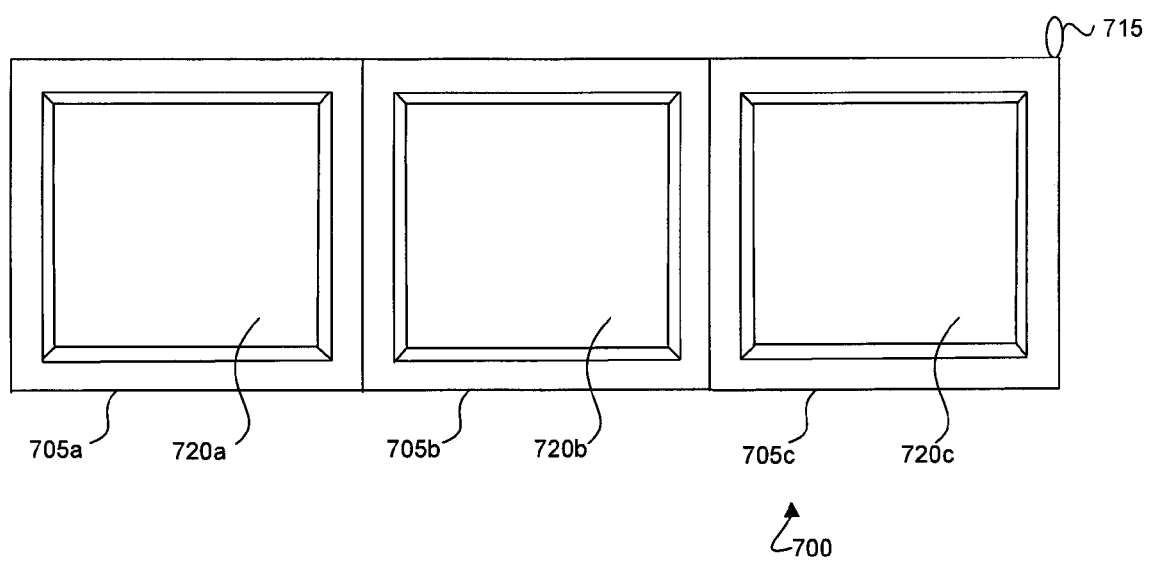
FIG. 7B is a side view of the digital display device illustrated in FIG. 7A with the displays arranged in a linear fashion.

FIG. 7B is a side view illustrating the digital display device 700 where the frame 705a is decoupled from the frame 705c and the frames 705 are arranged in a generally linear configuration. One or more of the frames 705 may also include a hanger or other means for hanging (not shown in FIG. 7B) that is configured to enable the digital display device 700, when the frames 705 are arranged in the generally linear configuration, to be attached to a surface (e.g., a surface of a wall). In some embodiments, the displays 720 may display content that differs based upon the configuration of the display device 700. For example, when the display device 700 is in a non-linear configuration (e.g., in the generally triangular configuration), each display 720 may display a different item of content. When the display device 700 is arranged in the generally linear configuration, the displays 720 may display a single item of content, such as a panoramic image, that spans all of the displays 720. As another example, in some embodiments, the frames 705 may be able to be completely detached from each other. In such embodiments, when the frames 705 are completely detached from each other, each display 720 in each frame 705 may display a different item of content. When one or more of the frames 705 are reattached to each other, the digital display device 700 may detect this reattachment and cause the displays 720 of the reattached frames 705 to display a single item of content that spans all of these displays 720.

Although the digital display device 700 is shown as having three frames 705, it may have more or fewer frames 705 (e.g., two frames 705, four or more frames 705), each frame 705 having a display 720. For example, the digital display device 700 may have four frames 705 coupled to each other and thus have a generally square configuration when viewed from above or below it.

Figure 8A:
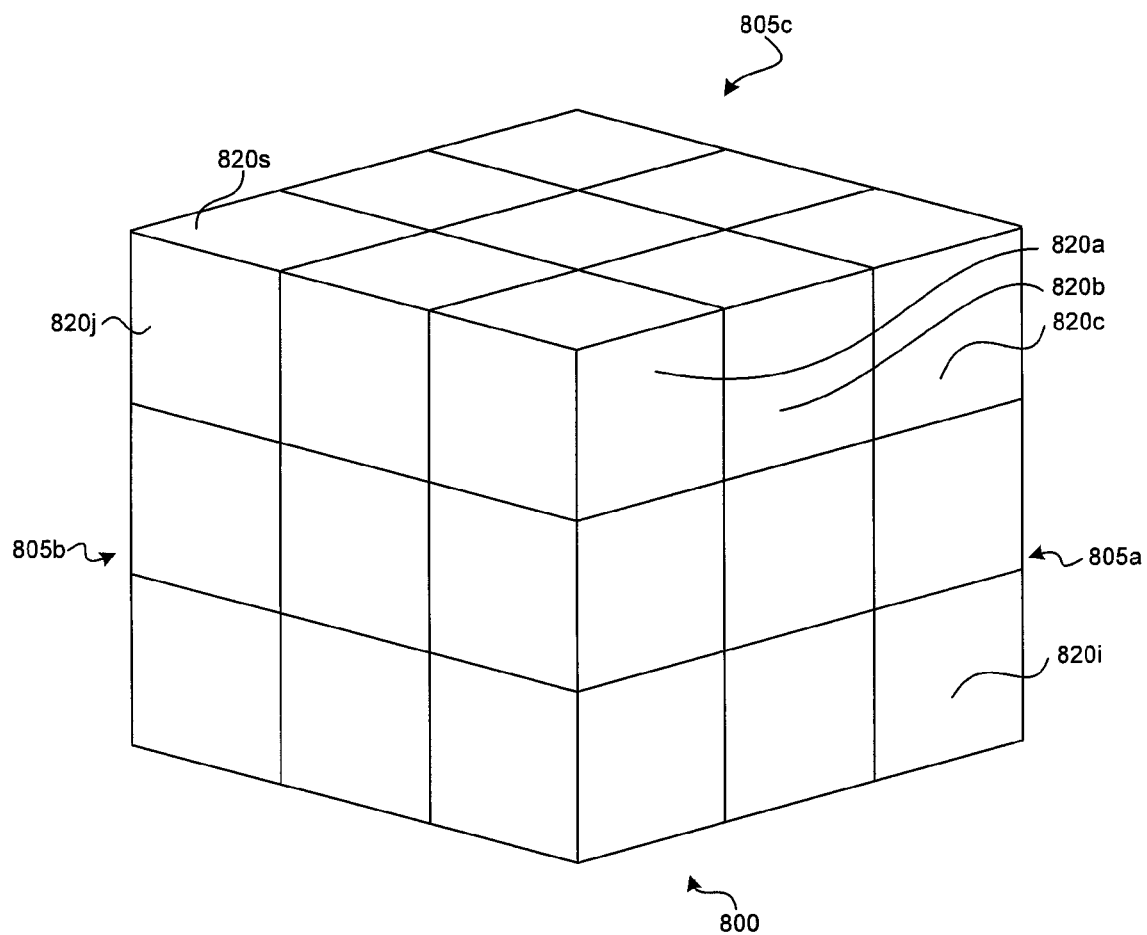
FIG. 8A is an isometric view of a digital display device having the form of a cube.

FIG. 8A is an isometric view of a digital display device 800 having the form of a cube. The digital display device 800 (referred to hereinafter as the digital display cube 800) has multiple faces 805, including a first side face 805a, a second side face 805b, a top face 805c, and three other faces (a third side face, a fourth side face, and a bottom face) that are not shown in the two-dimensional representation of FIG. 8A. One or more of the faces may include multiple distinct display regions 820. For example, the first side face 805a includes nine display regions 820, several of which are labeled, individually, as display regions 820a, 820b, and 820i. The second side face 805b also has nine display regions, such as display region 820j. The top face 805 also has nine display regions, such as display region 820s. The two other side faces of the digital display cube 800 (not illustrated in FIG. 8A) also have nine display regions. Although the faces 805 are illustrated as having nine display regions, each or any of the faces 805 may have more or fewer display regions 820 (e.g., a single display region 820 on a face 805, four display regions 820 on a face 805, etc.). Although regions 820 are illustrated as having generally square shapes, the regions 820 may have other shapes, such as rectangular shapes, triangular shapes, trapezoidal shapes, L-shaped shapes, X-shaped shapes, irregular shapes, etc.

Although the digital display device 700 is depicted with three faces and the digital display cube 800 is depicted with five viewable faces (the bottom not being viewable when the digital display cube 800 is set on a surface), it will be appreciated that the techniques disclosed herein allow the construction of display devices having any number of faces that are set at angles with respect to one another. Moreover, the faces are not required to have a generally square shape, and may have other shapes such as rectangular shapes, triangular shapes, trapezoidal shapes, etc. For example, a display device may have four triangular-shaped viewable faces with a square bottom and take the form of a pyramid. Those skilled in the art will understand that the digital display device is therefore not limited to the form illustrated in e.g., FIG. 7A and FIG. 8A and described herein.

The digital display cube 800 also has a bottom face (not illustrated in FIG. 8A) that allows the digital display cube 800 to be placed upon a surface (e.g., a generally horizontal surface). Because the bottom face is not viewable by a user when the cube is set on a surface, instead of a display region the bottom face may have non-skid feet, may provide access to batteries or other power supply, and may have one or more switches, displays, or other controls to operate the cube. For example, as described herein, the display regions 820 may be touch-sensitive, and the bottom face may include switches to activate and deactivate the touch-sensitive aspect of the display regions 820. The digital display cube 800 includes a variety of components to enable the functions described herein. For example, the display cube includes a power supply, such as batteries or a transformer to allow the cube to be connected to an AC outlet. The digital display cube 800 also includes components that enable the transfer of digital media to and from the cube, such as computer-readable media storage drives (e.g., USB drives, other flash drives, etc.), telecommunications components (such as an antenna and modem) that enable wired or wireless connections, and components that identify the digital display cube on a telecommunications network (e.g., a SIM card, smart card, etc.). Components that the digital display cube 800 may include are discussed in more detail with reference to, e.g., FIG. 12.

Figure 8B:
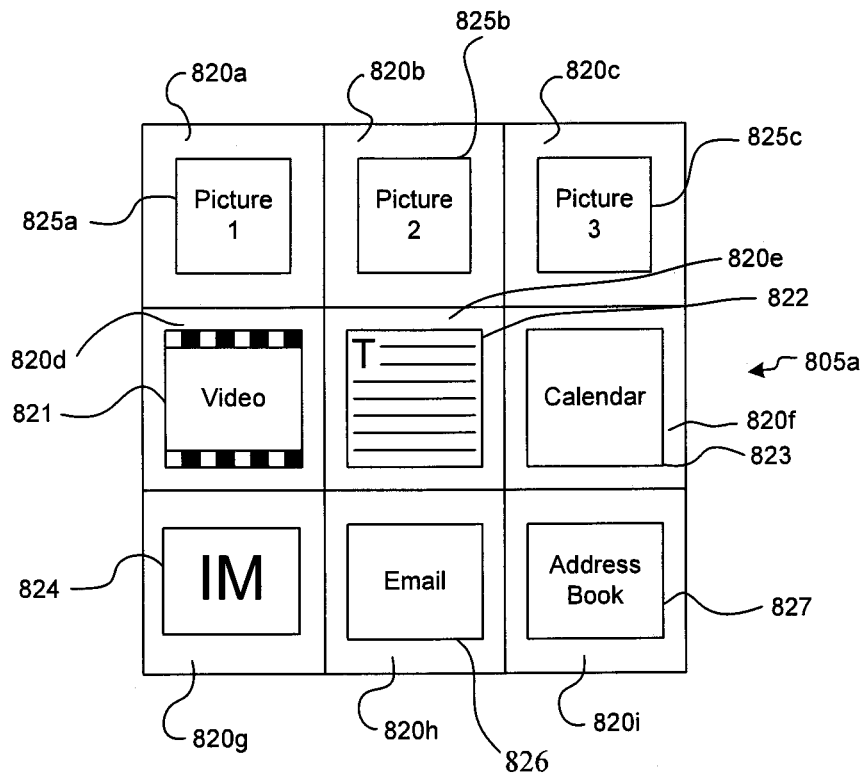
FIGS. 8B-8G are views of a face of the digital display cube illustrated in FIG. 8A.

FIG. 8B is a view of the face 805a of the digital display cube 800. Each display region 820 can display a different item of content. For example, display regions 820a-c display images 825a-c, respectively. Display region 820d displays a video clip 821, display region 820e displays a website 822 and display region 820f displays a calendar interface 823. Display region 820g displays an instant messaging session 824, display region 820h displays an email interface 826 and display region 820i displays an address book interface 827. Each of the display regions 820 can display any of the types of content described herein, as well as any other types of content suitable for display on an electronic display (e.g., text messages, interactive video games, televised content received over a wired or wireless connection, etc.). The digital display cube 800 may also receive content that has an audio component without a visual component (e.g., streamed music, an AM/FM radio feed, a Podcast, etc.). In such situation, the digital display cube 800 may play the audio component of the content, and display a screen saver or other visual aspect on one or more of the display regions 820.

Figure 8C:
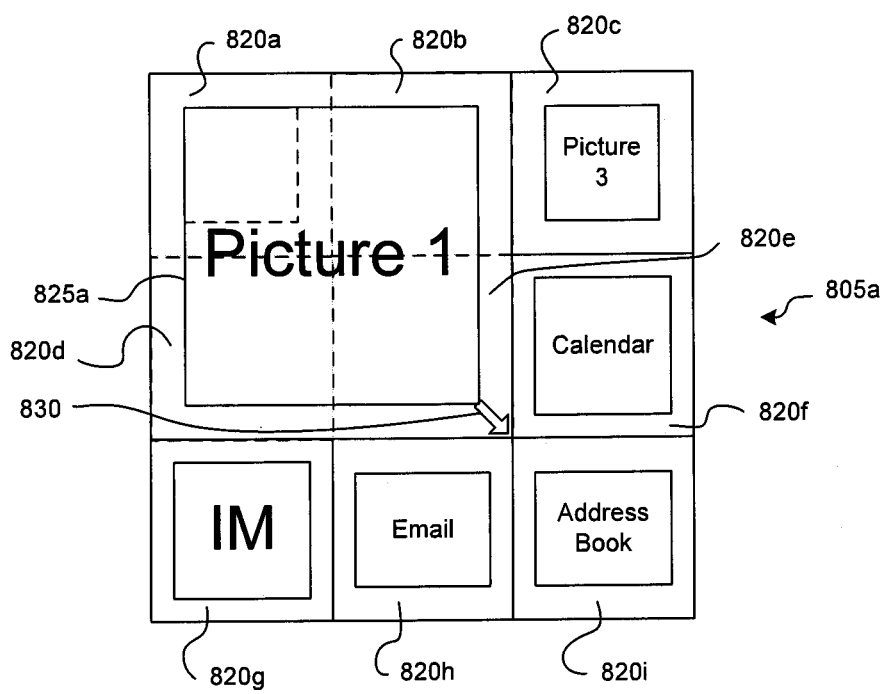

FIG. 8C is another view of the face 805a illustrating how two or more display regions 820 may be merged to form a larger, merged, display region in which content may be displayed. As illustrated, the display regions 820a, 820b, 820d and 820e have been merged to form a merged display region. When display regions are merged, a primary display region may be designated for the purposes of designating the content that is to be enlarged to fill the merged display region, and secondary display regions may be explicitly or implicitly designated for the purposes of designating the content that is to be displaced or hidden. These designations may be done in various ways. For example, one or more of the display regions 820 may be touch-sensitive, and the user may touch a first display region (e.g., the display region 820a) to "grab" the content displayed in the first display region (e.g., image 825a) and drag it in a downwardly and rightwardly fashion (e.g., in the direction of arrow 830) to enlarge the content into display regions 820b, 820d and 820e. Doing so displaces or hides the content formerly displayed in these display regions. As another example, a user may touch a first display region to designate it as the primary display region (e.g., the display region 820a) and then touch one or more second display regions to designate them as secondary display regions (e.g., the display regions 820b, 820d and 820e) that should be merged into or incorporated into the primary display region. Display regions that are non-contiguous may also be merged. For example, two non-contiguous display regions (e.g., display regions 820a and 820c on the same face, or two non-contiguous display regions on different faces 805) could be merged to form a merged display region that displays a single source of content. Those of skill in the art will understand that other ways of merging two or more display regions and/or enlarging content to fill two or more display regions may be used.

Figure 8D:
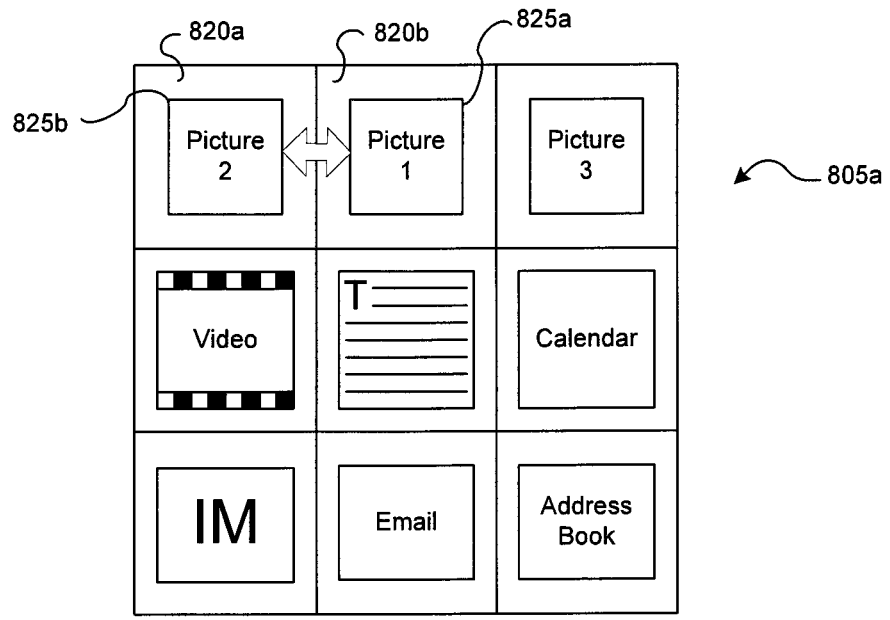

FIG. 8D is another view of the face 805a illustrating how the content of two or more display regions 820 may be switched. As illustrated, the image 825a, formerly displayed in display region 820a, is displayed in display region 820b, and the image 825b, formerly displayed in display region 820b, is displayed in display region 820a. The content of two display regions may be switched by, for example, a user using two fingers (e.g., the thumb and the forefinger) to "grab" the content displayed in the display regions and then bringing the two fingers together to switch the positions of the content displayed in the display regions. Other methods of switching the positions of content in display regions 820 may of course be employed.

Figure 8E:
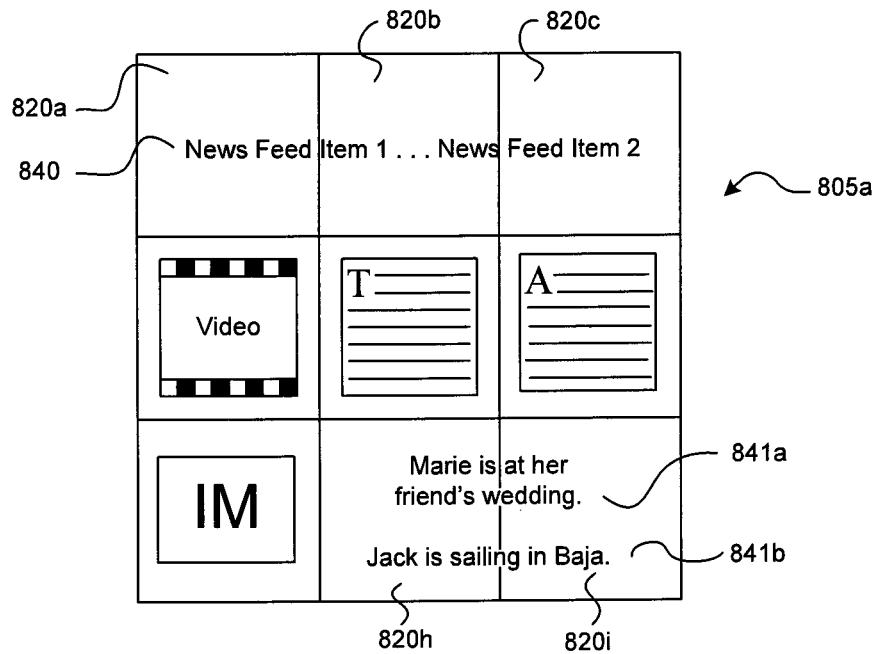

FIG. 8E is another view of the face 805a illustrating other types of content that may be displayed in the display regions 820. Display regions 820a-c are merged together to form a merged display region in which is displayed a news feed 840 containing one or more items of news. The news feed 840 may scroll across the three display regions that were merged to form a longer display that is more suitable for scrolling text. A user of the digital display cube 800 may subscribe to one or more news feeds or web feeds (e.g., RSS or Atom web feeds in XML format) that can be used to display content on the display regions. Display regions 820h and 820i are also merged to form a merged display region in which are displayed status messages 841a and 841b. A user of the digital display cube 800 may subscribe to status messages or updates that indicate a status or presence of another individual or a group of individuals, such as status messages from social networking or micro blogging services (e.g., Facebook, Twitter, etc.), and have them displayed on the display regions. Other types of content delivered over data transmission networks such as the Internet and/or telecommunications networks in other ways may also be displayed on the display regions 820.

Figure 8F:
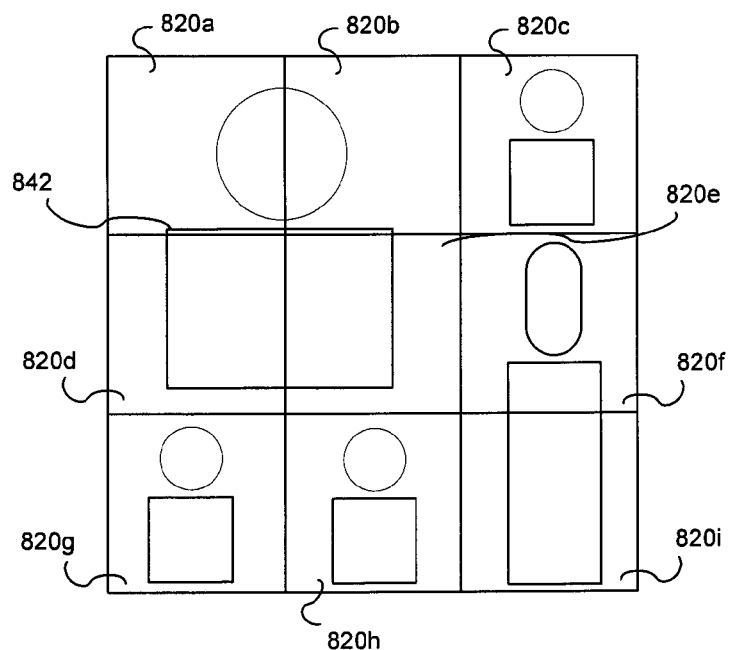

FIG. 8F is another view of the face 805a illustrating how a single item of content may be displayed multiple times in multiple display regions 820. As illustrated, display regions 820a, 820b, 820d and 820e are merged to form a merged display region in which is displayed an image 842. The image 842 is also displayed in three individual (i.e., non-merged) single display regions 820c, 820g and 820h. The image 842 is also displayed in two merged display regions 820f and 820i. Because the two display regions 820f and 820i form a merged display region that has a different aspect ratio (i.e., 1×2) than the aspect ratio of a single display region 820 (i.e., 1×1), the aspect ratio of the image 842 displayed is also changed. In other words, the image 842 is stretched (vertically in this case, although images may also be stretched horizontally) to display in the two display regions 820f and 820i.

Figure 8G:
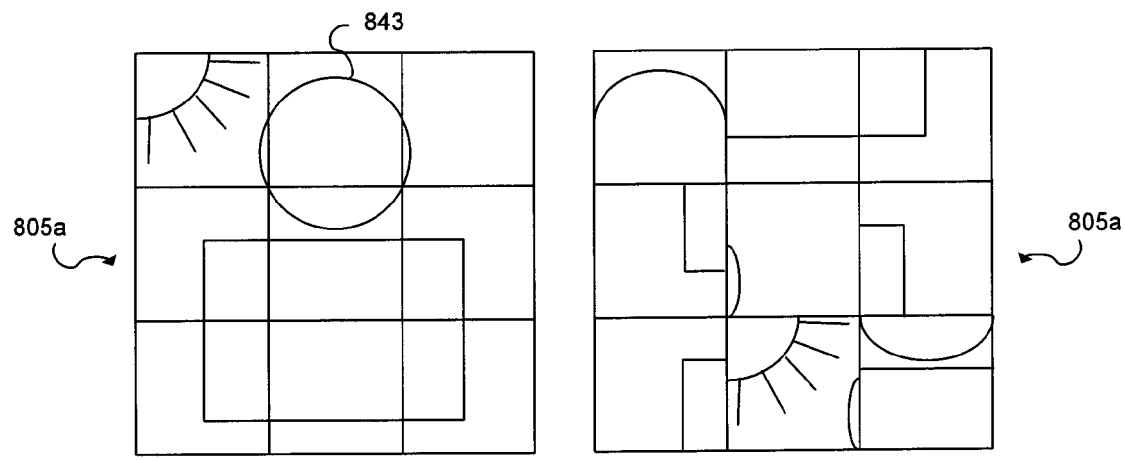

FIG. 8G is another view of the face 805a illustrating how an image displayed in more than one display region 820 may be "mixed up" or "jumbled." As illustrated, the image 843 is displayed across all nine display regions 820 of the left-hand face 805a. Mixing up or jumbling the image 843 causes each of the different display regions 820 on the face 805a to randomly display a portion of the image 843, as illustrated in the right-hand face 805a. A user may mix up or jumble an image by, for example, touching a display region 820 to cause a contextual menu to be displayed that provides an option for mixing up or jumbling an image. An image may be mixed up or jumbled more than once, with each time resulting in a random arrangement of the portions of the image. In some embodiments, the digital display cube 800 includes an accelerometer that enables it to detect an inclination, a vibration, and/or a shock incurred by it. When the digital display cube 800 detects such a motion, it may cause the images displayed in one or more display regions 820 to be mixed up or jumbled. As another example, the user may mix up or jumble an image by touching display regions 820 on opposing portions of a face 805 with two or more fingers and by moving the fingers across the face 805, thereby causing one or more portions of the image to be mixed up or jumbled.

Figure 8H:
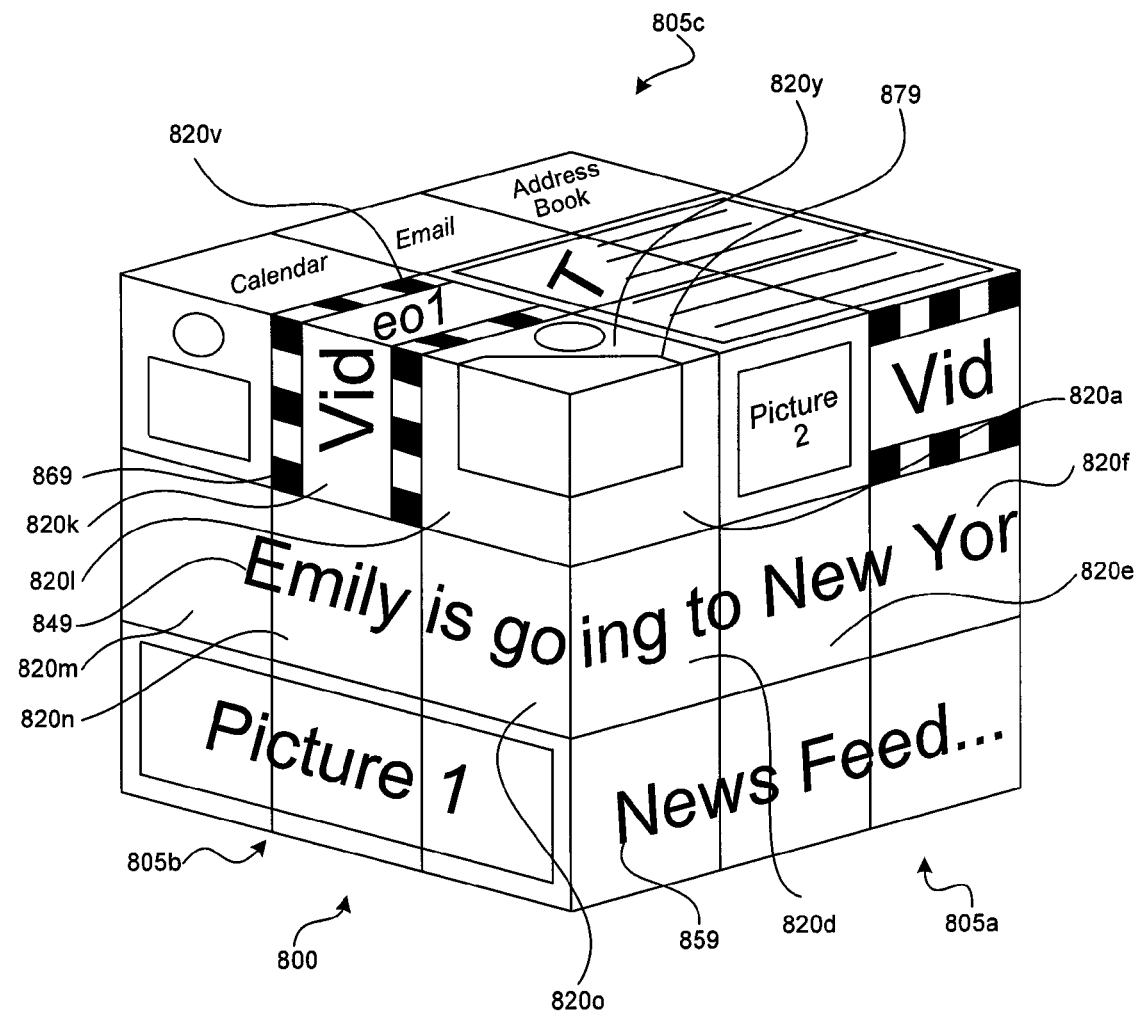
FIG. 8H is another isometric view of the digital display cube illustrated in FIG. 8A.

FIG. 8H is another isometric view of the digital display cube 800 illustrating how display regions 820 on two or more faces 805 may be merged in order to cause content to wrap around two or more faces. For example, display regions 820m, 820n and 820o on face 805b and display regions 820d, 820e and 820f on face 805a have been merged to form a merged display region for the display of a status message 849. The corresponding display regions on the other two side faces 805 of the digital display cube 800 may also be merged into this merged display region such that the status message 849 wraps all the way around the digital display cube 800. As another example, display region 820k on face 805b and display region 820v on face 805c are merged to form a merged display region for the display of a video clip 869. As another example, display regions 820a, 820l and 820y on faces 805a, 805b and 805c, respectively, are merged to form a merged display region in which is displayed a digital image 879 that is stretched to display in all three display regions 820. The display regions 820 of the digital display cube 800 can be merged or configured in various ways to display content in numerous different ways.

Figure 9:
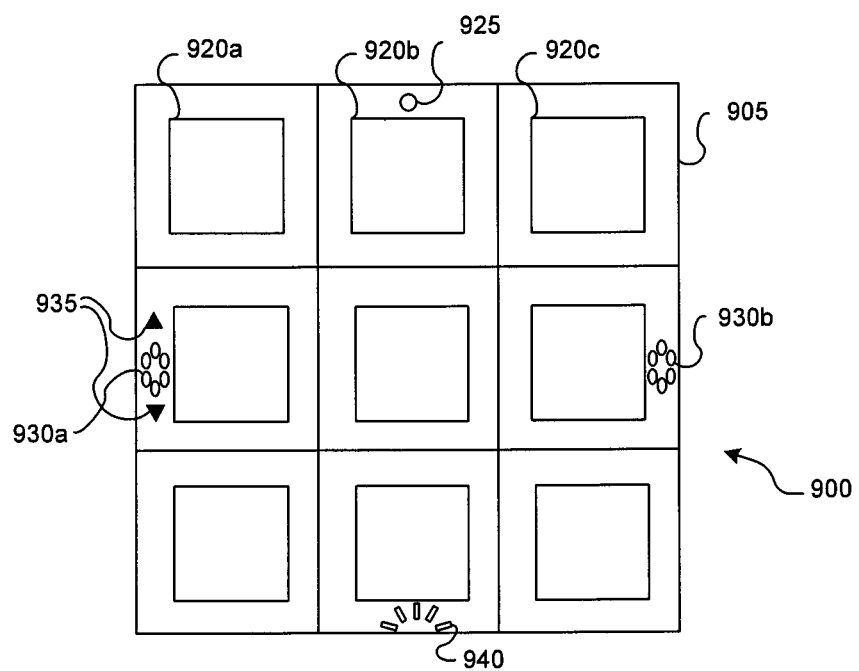
FIG. 9 is a view of a digital display cube having inbound and outbound communication channels.

FIG. 9 is a side view of a face 905 of a digital display cube 900 configured in accordance with an embodiment of the invention. The face 905 carries nine display regions 920 (several of which are individually labeled as display regions 920a-c). The face 905 also carries audio output components 930 (shown individually as audio output components 930a and 930b). The audio output components are left and right stereo speakers that are configured to produce sound. The digital display cube 900 also includes an audio input component 940 (e.g., a microphone) that is configured to receive sound. The display regions 920 may be touch-sensitive. Touch-sensitive display regions 920, when activated or actuated by a user (e.g., by touch and then selection of a contextual menu option), are configured to cause the digital display cube 900 to initiate a real-time communication session with the source associated with the content that is displayed on the touch-sensitive display region 920 at the time the touch-sensitive display region 920 is touched. For example, if an image of an individual who uses or operates a source (e.g., a digital photograph of the individual) is displayed in a particular display region 920, the user can touch the particular display region 920 to cause the digital display cube 900 to initiate a real-time communication session (such as a voice call, a video call (e.g., a Skype video/voice call), an e-mail, a text message, an instant messaging session or other communication) with that individual. Upon successfully reaching the individual after initiating a voice call, the user can speak into the audio input component 940 and hear the individual via sound generated by the audio output components 930. The user can adjust the volume of the sound generated by the audio output components 930 by utilizing up and down buttons 935 or via the touchscreen. When the user desires to end the call, the user can again activate or actuate the touch-sensitive display region 920 to cause the digital display cube 900 to end the initiated voice communication. In some embodiments, a display region 920 is associated with a source or sources used or operated by multiple individuals. For example, a display region 920 may be associated with a source used or operated by two individuals. The user can touch the display region 920 associated with the source to initiate real-time communications with the individuals (e.g., three-way calling; a chat room session, an instant messaging session, a live video conferencing session, etc.).

In some embodiments, if an image of an individual who uses or operates a source (e.g., a digital photograph of the individual) is displayed in a particular display region 920, the user can "tap" the particular display region 920 with a mobile device of the user (e.g., using methods described in the previously referenced PCT/US08/54793). This causes the digital display cube 900 to transfer to the user's mobile device a telephone number of the individual displayed in the particular display region 920. The user's mobile device can then automatically initiate a telephone call to the individual. Alternatively or additionally, the digital display cube 900 may transfer other identifying information (e.g., an email address of the individual, an instant message identifier of the individual, etc.) to the user's mobile device. The user's mobile device can then automatically initiate an appropriate real-time communication (e.g., an email message, an instant message, a text message, etc.) with the individual using the identifying information transferred to it by the digital display cube 900.

In some embodiments, as described with respect to the digital display device 300, while a user is engaged in a real-time communication with a first individual, the user can initiate a second real-time communication session with a second individual who uses or operates a second source, and conference the two individuals together into a group real-time communication session using features provided by the digital display cube 900.

The digital display cube 900 also includes a camera 925 that is configured to capture still or moving images for transmittal to the telecommunications network and ultimately to a remote recipient, and a button (not shown in FIG. 9) configured to activate the camera 925. For example, a user can position himself or herself in front of the camera 925 and activate the camera 925 (e.g., by pressing the button, utilizing a remote or otherwise successfully triggering the digital display device's functionality) to capture a still or moving image of himself or herself. The user can then touch a touch-screen display region 920 to send the captured image to the individual using or operating the source associated with the touch-screen display region 920. In some embodiments, the user can activate the camera 925 before or during an initiated real-time communication session and cause the digital display cube 900 to transmit one or more still or moving images over the telecommunications network to a remote recipient. A user of the digital display cube 900 can thus provide content to another user, such as another user of another digital display cube. During the real-time communication session, the digital display cube 900 displays content (e.g., video, still images, etc.) on a face 905 from the other user with whom the user is communicating. In some embodiments, during a real-time communication session, one or more of the display regions 920 on the face 905 can function to display content (e.g. video, still images, etc.) from the other user with whom the user is communicating (e.g., in a picture-in-picture, video-in-video, picture-in-video or video-in-picture fashion). This enables the user of the digital display cube 900 to view both the content associated with the other user as well the content that the other user can view on their respective device (e.g., the content captured by the camera 925).

In some embodiments, the digital display cube 900 may be used to facilitate a conference or group communication between a number of individuals. For example, if each of the side faces of the digital display cube contained a camera 925, the digital display cube 900 may be placed in the center of a table or a desk and users wishing to participate in the group communications session would sit in positions surrounding the digital display cube 900. The cameras 925 would transmit still or video pictures of the individuals to the other party or parties that receive the communication. The individuals surrounding the digital display cube 900 may view the party or parties to which they are communicating on the display regions 920. If there is only one receiving party, all nine of the display regions 920 may be merged to display a single image or video of the receiving party. If there are multiple receiving parties, one or more display regions 920 may be associated with each receiving party.

Figure 10:
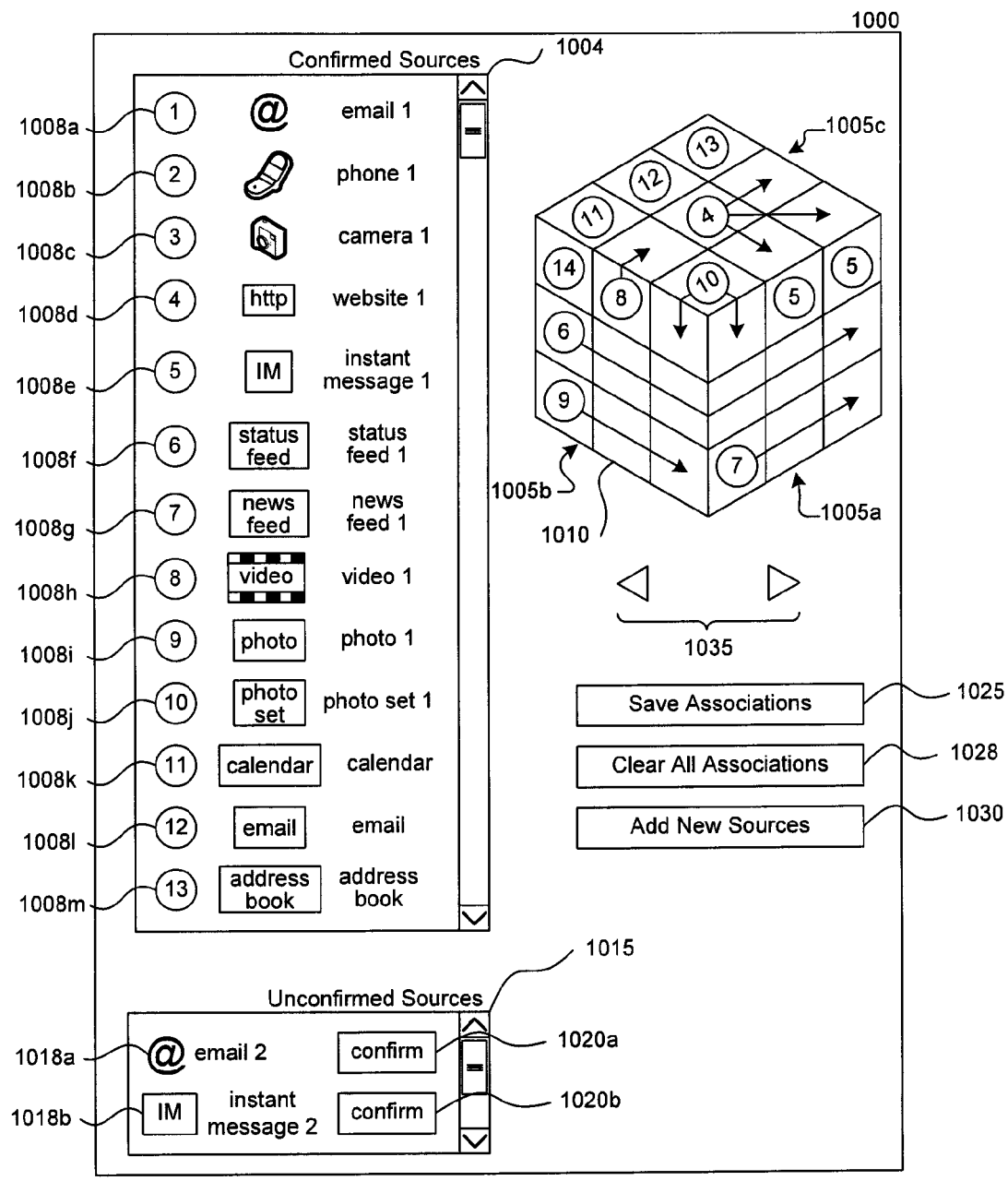
FIGS. 10 and 11 illustrate representative interfaces for creating associations between sources of content and display regions of a digital display cube.

FIG. 10 illustrates a representative interface 1000 for creating associations between sources of content and display regions of a digital display cube. The interface 1000 includes a confirmed sources list 1004 displaying a number of sources 1008 (shown individually as sources 1008a-m). Each source 1008 corresponds to a different actual source of content. Sources of content may include, but are not limited to, a mobile phone, a digital camera, another digital display device, a digital video camera, a personal computer, a website, a video clip, a photo set or collection of photos, an individual photo, a calendar application, an address book application, an email application, a news feed, a status feed, etc. Each source 1008 has an identifier (not shown) associated with it that allows content to be sent to or received from the source. Identifiers include, but are not limited to, a telephone number, an IMSI, an e-mail address, an IP address, a MAC address, a website address, a Uniform Resource Identifier (URI) or other identifier. For example, source 1008a may have an email address associated with it; source 1008b may have a telephone number associated with it; and each of sources 1008d, 1008e, 1008f and 1008g may have a URI (e.g., a website address) associated with it. The interface 1000 also includes a virtual representation 1010 that depicts the layout of the user's physical digital display cube. The virtual representation 1010 may be rotated or spun by use of controls 1035. The representation 1010 includes display regions that correspond to the display regions on the user's actual digital display cube (i.e., each depicted display region on the virtual representation maps to one of the display regions of the physical display cube). The user can create associations between a source 1008 and a display region by dragging and dropping the source 1008 to the desired display region. Alternatively, the user can move a display region to the desired source, assign a code to each source that maps to a display region, or use some other method to create associations. As shown in FIG. 10, each display region or regions in the virtual representation 1010 contains a number which correlates with numbers associated with each source 1008 in the confirmed source list 1004.

A source may be associated with a merged display region consisting of two or more individual display regions (e.g., two display regions on a same face, or two display regions on two different contiguous or non-contiguous faces). For example, source 1008i, which corresponds to a photo, is associated with a merged display region consisting of the three lower display regions on face 1005b of the virtual representation 1010. As another example, source 1008f, which corresponds to a status feed, is associated with a merged display region consisting of the three middle display regions on face 1005b and the three middle display regions on face 1005a of the representation 1010. The association across two faces allows the status feed content corresponding to the source 1008f to be displayed on the actual digital display cube in scrolling fashion from one face to another. As another example, source 1008j, which corresponds to a set of photos or collection of photos, is associated with a merged display region consisting of three contiguous display regions, one on face 1005a, one on face 1005b and one on face 1005c. Accordingly, the photos in source 1008j will be stretched or constrained to display in all three display regions. A source may also be associated with two distinct non-merged display regions. For example, source 1008e, corresponding to an instant messaging session, is displayed in each of two upper display regions on face 1005a. These two display regions are non-merged, meaning that an instance of the content corresponding to the instant messaging session will be displayed in each of the two display regions. More than one source 1008 may be associated with a single display region on the virtual representation 1010 so as to enable the corresponding physical display region to display content from more than one source.

Although not depicted in FIG. 10, a control may be provided to allow a user to specify that a display region is to display content from a randomly selected source 1008. A user may also specify that a source is to be rotated or periodically moved from one display region to another display region. The user can save the created associations by selecting a "Save Associations" button 1025. The user can clear the created associations to start over by selecting a "Clear All Associations" button 1028. Creating associations using the interface 1000 allows the user to specify a display region to which content from an individual source of content should be sent or received. Therefore, the interface 1000 enables the user to have granular control over associations between sources of content and display regions of an actual digital display cube.

The interface 1000 also includes an unconfirmed sources region 1015 displaying a number of unconfirmed sources 1018 (shown individually as unconfirmed sources 1018a and 1018b). Unconfirmed sources may be a result of unknown or not-approved sources sending a request to a user to send content to the user. The user may be required to confirm unconfirmed sources 1018 (e.g., by selecting the corresponding confirm button 1020) before content from the unconfirmed sources 1018 will be associated with the numbered display regions. When the user confirms an unconfirmed source 1018, it may be automatically added to the confirmed sources region 1004, or the user could be prompt to add it to the confirmed sources region 1004. Requiring the user to confirm unconfirmed sources 1018 thus prevents unconfirmed sources 1018 from having content automatically displayed on the user's physical digital display device. The user can manually add new sources of content by selecting an "Add New Sources" button 1030, which displays an interface (not shown) for adding new sources of content.

Figure 11:
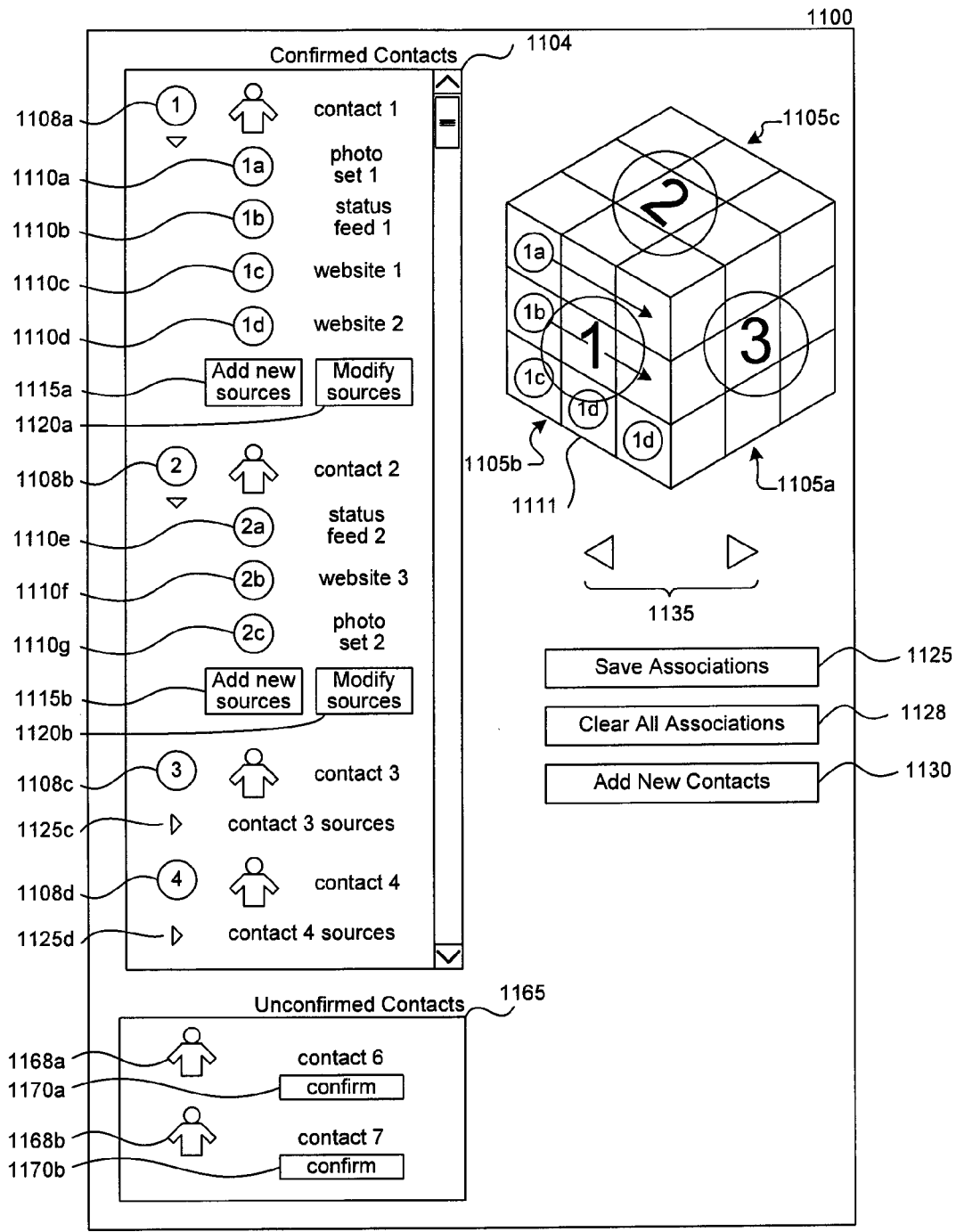

FIG. 11 depicts another interface 1100 that enables the user to create associations between contacts and display regions of a digital display cube. Each contact 1108 corresponds to an actual individual person. The interface 1100 includes a confirmed contacts list 1104 displaying a number of contacts 1108 (shown individually as contacts 1108a-d). Each individual person may have one or more sources of content 1110 (e.g., a mobile phone, a digital camera, another digital display device, a digital video camera, a personal computer, a website, a video clip, a photo set or collection of photos, an individual photo, a calendar application, an address book application, an email application, a news feed, a status feed, etc.) associated with him or her. For example, the individual corresponding to contact 1108a has associated with him or her a photo set 1110a, a status feed 1110b, a first website 1110c and a second website 1110d, and the individual corresponding to contact 1108b has associated with him or her a status feed 1110e, a website 1110f, and a photo set 1110g. The sources of content 1110 associated with contacts 1108c and 1108d are not displayed but can be by selecting arrows 1125c and 1125d, respectively. The contact 1108a also has two associated buttons 1115a and 1120a that enable the user to add new sources of content and modify existing sources of content, respectively, for this contact. The contact 1108*b* also has two associated buttons 1115*b* and 1120*b* that enable the user to add new sources of content and modify existing sources of content, respectively, for this contact. Each source of content 1110 has an identifier (not shown) associated with it that allows content to be sent to or received from the source. Identifiers include, but are not limited to, a telephone number, an IMSI, an e-mail address, an IP address, a MAC address, a website address, a URI or other identifier.

The interface 1100 allows the user to associate all of (or some subset of) the sources of content 1110 associated with an individual with one or more display regions of the user's actual digital display cube. Similar to the interface depicted in FIG. 10, the interface 1100 includes a virtual representation 1111 that depicts the layout of the user's actual digital display cube. The virtual representation 1111 may be rotated or spun by use of controls 1135. The virtual representation 1111 includes display regions that correspond to the display regions on the user's actual digital display cube (i.e., each depicted display region on the virtual representation 1111 maps to one of the display regions of the actual digital display cube). The user can create associations between a contact 1108 (or a source of content 1110) and a display region by dragging and dropping the contact 1108 (or a source of content 1125) to the desired display region. Alternatively, the user can move a display region to the desired contact (or to a source of content 1110), assign a code to each contact (or source of content 1110) that maps to a display region, or use some other method to create associations. As shown in FIG. 11, each display region or regions in the virtual representation 1111 contains a number which correlates with numbers associated with each contact 1108 (or with each source of content 1110) in the confirmed contact list 1104.

The interface 1100 allows the user to associate an entire face of the user's actual digital display cube with the sources of content 1110 associated with a specific individual. As illustrated in FIG. 11, the virtual representation 1111 depicts that the face 1105*c* is associated with contact 1108*b*. The user's actual digital display cube could rotate randomly among the sources of content 1110 associated with that contact 1108*b*, such as the individual's status feed 1110*e*, a website 1110*f* of the individual, and a set of photos 1110*g* associated with the individual. For example, the actual digital display cube could normally display in the display regions on the face 1105*c* the set of photos 1110*g* associated with the individual. When the actual digital display cube receives status updates for the individual (source of content 1110*e*), it could display them in one or more specific display regions on the face 1105*c*. After a specific period of time, the displayed status updates could fade out or slowly disappear, and the normally displayed set of photos 1110*g* could fade in or reappear and resume being displayed in display regions on the face 1105*c*.

Although not depicted in FIG. 11, a control may be provided to allow a user to specify that a display region is to display content from a randomly selected contact 1108 (or from a randomly selected source of content 1110). A user may also specify that a contact 1108 (or a source of content 1110) is to be rotated or periodically moved from one display region to another display region. The user can save the created associations by selecting a "Save Associations" button 1125. The user can clear the created associations to start over by selecting a "Clear All Associations" button 1128. Creating associations using the interface 1100 allows the user to specify a display region to which content from a contact 1108 (or content from a source of content 1110) should be sent or received. Therefore, the interface 1100 enables the user to have granular control over associations between contacts 1108 (or sources of content 1110) and display regions of an actual digital display cube.

The interface 1000 also includes an unconfirmed contacts region 1165 displaying a number of unconfirmed contacts 1168 (shown individually as unconfirmed sources 1168*a* and 1168*b*). Unconfirmed contacts 1168 may be a result of unknown or not-approved contacts sending a request to a user to send content to the user. The user may be required to confirm unconfirmed contacts 1168 (e.g., by selecting the corresponding confirm button 1170) before content from the unconfirmed contacts 1168 may be associated with the display regions of the virtual representation 1111. When the user confirms an unconfirmed contact 1168, it may be automatically added to the confirmed contacts region 1104, or the user could be prompt to add it to the confirmed contacts region 1104. Requiring the user to confirm unconfirmed contacts 1168 thus prevents unconfirmed contacts 1168 from having content automatically displayed on the user's actual digital display cube. The user can manually add new contacts by selecting an "Add New Contacts" button 1130, which displays an interface (not shown) for adding new contacts.

The interfaces 1000 and 1100 are not mutually exclusive and could be combined to allow the user to create associations between individuals and actual display regions while still allowing granular control on a contact basis. For example, the user could create associations on an individual basis using the interface 1100. The user could then expand the contacts 1108 to show the sources of content 1110 associated with each contact 1108, and then delete sources of content 1110 or move sources of content 1110 amongst the different display regions. Those of skill in the art will understand that other methods of creating associations between sources of content and actual display regions are possible.

One skilled in the art will appreciate that a process for creating associations between content sources and display regions of a digital display cube may be implemented by a server or computing device (e.g., an activation server) or by the digital display cube itself. One skilled in the art will also appreciate that the interfaces 1000 and/or 1100 may be provided by a server or computing device (e.g., a web server) or by the digital display cube itself. If provided by a server or computing device, the interfaces 1000 and/or 1100 may be generated and presented to a user on a website operated by a manufacturer of a display device, by a service provider that provides telecommunications or other services to a purchaser of a display device, or by any other third-party. When the interface is presented on a website, the one or more servers or computing devices generating the interface may connect with other systems that act as intermediaries between the sources of content and digital displays, and may provide the interface 1000 and/or 1100, store data received via the interface, communicate changes made via the interface to display devices, and route content between sources of content and display devices in accordance with the received settings. In some embodiments, the digital display cube implements the association creation process, provides the interfaces 1000 and/or 1100 (e.g., by an embedded web server), and stores the data received via these interfaces (e.g., in a storage medium). For example, the digital display cube can display in one or more display regions an alphanumerical keyboard that the user can use to input identifiers identifying sources and/or to create associations. Alternatively or additionally, a user may use another wireless device (e.g., a wireless keyboard, a mobile device, a personal computer with a wireless card and/or a Bluetooth interface) to provide input to the digital display device to identify sources and/or to create associations.

Figure 12:
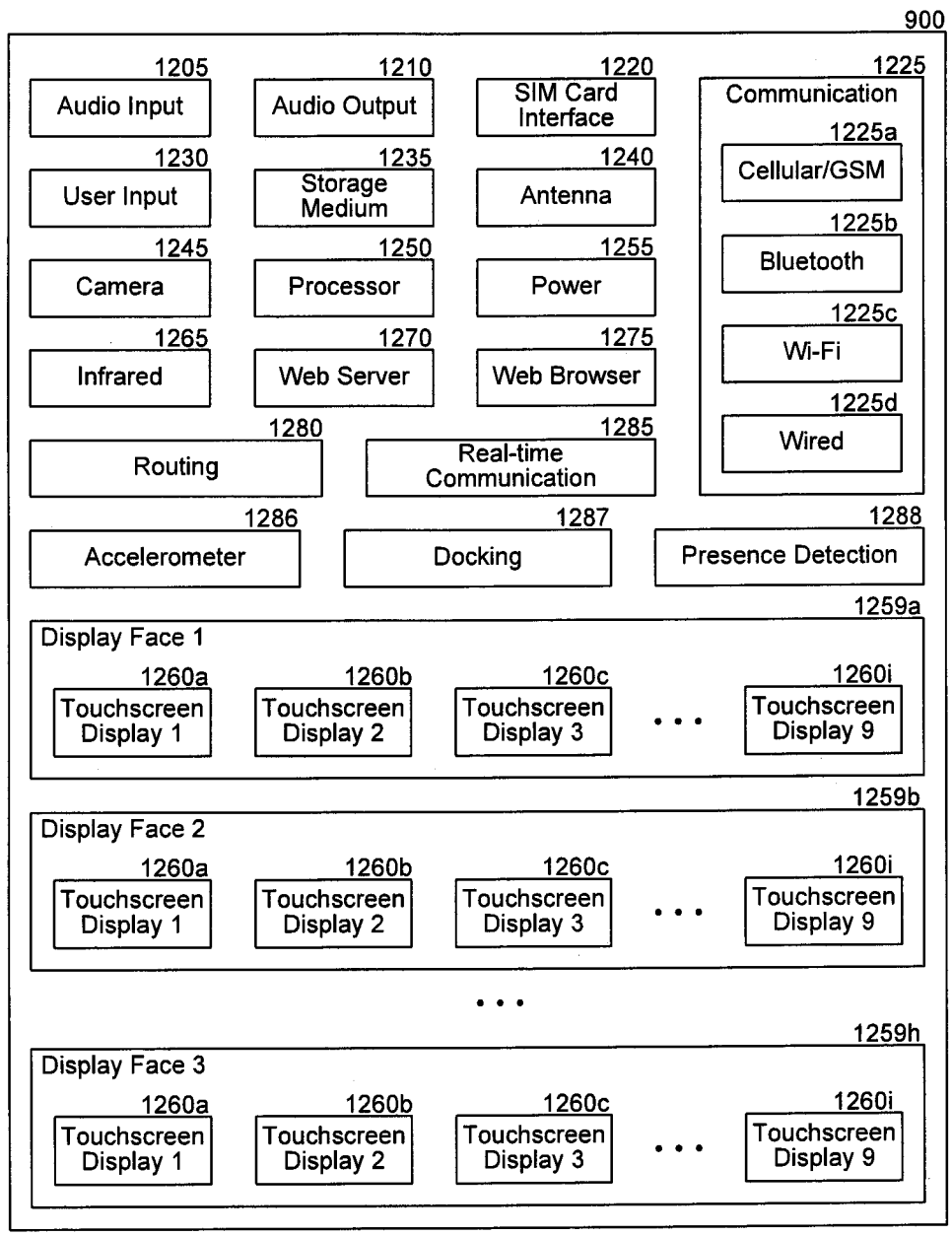
FIG. 12 is a schematic view of components of the digital display cube illustrated in FIG. 9.

FIG. 12 is a schematic view of components of the digital display cube 900 illustrated in FIG. 9. The digital display cube 900 includes various components that enable it to provide the functionality described herein as well as additional functionality. These components include an audio input component 1205 (e.g., microphone) and an audio output component 1210 (e.g., speakers). A user input component 1230 (e.g., buttons, alpha-numerical keyboard, etc.) enables the user to interact with the digital display device (e.g., adjust speaker volume, access stored content, adjust configuration settings, etc.). A camera component 1245 (e.g., digital camera) captures images (e.g., still or moving images). A storage medium component 1235 (e.g., hard drive, flash memory, memory card, etc.) stores content and other data (e.g., processing instructions, configuration settings, etc.). A processor 1250 executes processing instructions. The digital display cube 900 also may include a SIM card interface 1220, which enables the digital display cube 900 to receive a SIM card for purposes of accessing a GSM/GPRS/EDGE/UMTS telecommunications network, and an antenna 1240 for transmitting and receiving wireless signals. The digital display cube 900 also includes a power source 1255 (e.g., batteries, AC/DC converter, etc.).

The digital display cube 900 also includes a communication component 1225, which may include a GSM/GPRS/EDGE/UMTS component 1225a, a Bluetooth component 1225b, a Wi-Fi component 1225c and/or a wired component 1225d (e.g., RJ-11 port, Ethernet port, etc.). The Bluetooth component 1225b and/or the Wi-Fi component 1225c enable the digital display cube 900 to transmit and receive wireless signals in the 2.4 GHz Industrial Scientific Medical (ISM) band. Other wireless protocols (e.g., Mobile Broadband Wireless Access (MBWA), Ultra Wideband (UWB), ZigBee and other protocols) may also be supported. The digital display cube 900 also includes an infrared component 1265 that enables communication over an infrared spectrum (e.g., for communicating with a remote control that operates the digital display cube 900).

The digital display cube 900 also includes eight display face components 1259 (although only three—display face components 1259a, 1259b and 1259h—of which are shown). Each display face component 1259 corresponds to a face 905 of the digital display cube 900. Each display face component 1259 may comprise one or several touchscreen liquid crystal displays 1260 (shown individually as touchscreen displays 1260a-i), each of which corresponds to a display 920 on a face 905 of the digital display cube 900. Alternatively, the digital display cube 900 may include a single touchscreen liquid crystal display that is mapped via software to provide the various display regions. The displays 1260 display content associated with the display regions and are touch-activated to provide varied functionality. In addition to displaying content, the touchscreen displays 1260 can display user interfaces (e.g. alphanumerical keyboard, buttons for selecting options, menus, etc.) that enable users to interact with the digital display cube 900, either by using the touchscreen displays or by a remote.

The digital display cube 900 also includes a routing component 1280 that automatically routes received content to the appropriate display 1260. The digital display cube 900 also includes a real-time communication component 1285 (e.g., hardware and/or software for audio and/or video communication, hardware and/or software for text messaging, instant messaging, or chat room messaging). In some embodiments, the digital display cube 900 includes a web server component 1270 that provides interfaces (such as those described with reference to FIGS. 10 and 11) for interacting with the digital display cube 900. The digital display cube 900 may also include a browser component 1275 that fetches or retrieves content over an HTTP connection or other supported protocol (e.g., File Transfer Protocol (FTP), Secure Shell (SSH), RSS feeds, etc.).

The digital display cube 900 also includes an accelerometer component 1286 that measures acceleration and gravity induced reaction forces. When the accelerometer component 1286 detects acceleration, the digital display cube 900 may change and/or rearrange content on one or more of the display regions 920, update content, jumble or mix up content on one or more of the display regions 920, switch between connected users, etc. In some embodiments, the digital display cube 900 also includes a docking component 1287 that enables it to dock with a docking station (e.g., for transferring content to the digital display cube 900, for charging its batteries, etc.).

In some embodiments, the digital display cube 900 also includes a presence detection component 1288 that enables it to detect the proximal presence of an individual, and display content associated with that individual. For example, the presence detection component 1288 may include a polling radio frequency identification (RFID) transceiver that polls proximal RFID transponders or RFID tags (included in e.g., mobile devices such as phones), receives identifiers from such RFID transponders, determines an individual based upon the identifier, and displays content associated with that individual or appropriate to that individual. As an example of this functionality, the digital display cube 900 may detect that a mobile device of an individual is proximate. The digital display cube 900 may request that the mobile device provide its telephone number to the digital display cube 900. The digital display cube 900 can then use the telephone number to look up (e.g., in an index stored on the storage medium component 1235) the individual associated with that telephone number. If the individual is a confirmed contact, the digital display cube 900 can then determine sources of content associated with that individual, and display the content on one or more displays 920 of one or more faces 905 of the digital display cube 900.

The digital display cube 900 can also include other components, circuits, chips, etc. that enable it to provide the functionality described herein as well as additional functionality.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A digital display device for the display of content associated with at least one source of content, the digital display device comprising:
    a touchscreen display configured to provide multiple distinct display regions for the display of content,
        wherein, in response to a user command, two or more of the multiple distinct display regions are merged to form a merged display region for the display of content;
    a communication component configured for two-way communication, via a telecommunications network, with respect to one or more sources of content,
        wherein the two-way communication comprises receiving signals containing content associated with a source of content and transmitting signals to an individual associated with that source of content;

a storage component configured to store associations between each source of content and at least one of the multiple distinct display regions,
  wherein an association is created between one source of content and one of the distinct display regions and/or between one source of content and the merged display region;
a routing component coupled to the communication component, the storage component, and the display, the routing component:
  analyzing received content to identify a source of the received content;
  accessing the storage component to determine the distinct display region and/or the merged display region associated with the identified source of the received content; and
  routing the received content to the determined distinct display region or the determined merged display region for display,
    wherein the received content is displayed automatically within the determined distinct display region and/or the merged display region associated with the identified source of the received content; and
    in response to a user selection of the determined distinct display region or determined merged display region displaying the received content:
      accessing the storage component to identify an individual associated with the identified source of the received content; and
      initiating a two way communication session with the identified individual through the communication component.

2. The digital display device of claim 1, wherein an association is created between a source of content and all of the multiple distinct display regions.

3. The digital display device of claim 1, wherein the merged display region includes all of the multiple distinct display regions.

4. The digital display device of claim 1, wherein the merged display region is defined by a dual user selection of a first distinct display region and a second distinct display region.

5. The digital display device of claim 4, wherein the merged display region is further defined by a user selection of a third distinct display region.

6. The digital display device of claim 4, wherein the display is touch sensitive and the dual user selection is made by a user touching the first distinct display region and touching the second distinct display region.

7. The digital display device of claim 1, wherein the display is further configured to display an interface that enables a user to merge two or more of the multiple distinct display regions to form the merged display region and to create an association between the one source of content and one of the distinct display regions and/or between the one source of content and the merged display region.

8. The digital display device of claim 1, wherein the telecommunications network is a wireless network.

9. The digital display device of claim 1, wherein the merged display region is further defined by all of the multiple distinct display regions on the display, and wherein the merged display region displays content associated with a single individual.

10. The digital display device of claim 1, further comprising an accelerometer configured to detect a movement of the digital display device, wherein when the accelerometer detects the movement, at least one association between the one or more sources of content and a distinct display region is changed.

11. A digital display device for the display of content associated with at least one source of content, the digital display device comprising:
  a touch-sensitive display configured to provide multiple distinct display regions for the display of content,
    wherein, in response to a user command, two or more of the multiple distinct display regions are merged to form a merged display region for the display of content;
  a communication component configured for two-way communication, via a telecommunications network, with one or more sources of content,
    wherein the two-way communication comprises receiving signals containing content associated with a source of content and transmitting signals to an individual associated with that source of content:
  a storage component configured to store associations between each source of content and at least one of the multiple distinct display regions, wherein an association is created between one source of content and one of the distinct display regions and/or between one source of content and the merged display region; and
  a routing component coupled to the communication component, the storage component, and the display, the routing component:
    analyzing received content to identify a source of the received content;
    accessing the storage component to determine the distinct display region and/or the merged display region associated with the identified source of the received content;
    routing the received content to the determined distinct display region or the determined merged display region for display,
      wherein the received content is displayed automatically within the determined distinct display region and/or the determined merged display region associated with the identified source of the received content; and
    in response to a user selection of the determined distinct display region or determined merged display region displaying the received content:
      accessing the storage component to identify the individual associated with the identified source of the received content; and
      initiating a two-way communication session with the identified individual through the communication component.

12. The digital display device of claim 11, wherein the two or more of the multiple distinct display regions are merged by receiving from a user a first touch of a first distinct display region and a second touch of a second distinct display region.

13. The digital display device of claim 11, wherein content displayed in a first distinct display region is switched with content displayed in a second distinct display region by receiving from a user a first touch of the first distinct display region and a second touch of the second distinct display region.

14. The digital display device of claim 11, wherein the merged display region is further defined by all of the multiple distinct display regions on the touch-sensitive display, and wherein the merged display region displays content associated with a single individual.

15. The digital display device of claim 11, further comprising an accelerometer configured to detect a movement of the digital display device, wherein when the accelerometer detects the movement, at least one association between the one or more sources of content and a distinct display region is changed.

16. An electronic display device for the display of content associated with at least one source of content, the electronic display device comprising:
- means for two-way communication with one or more sources of content via a telecommunications network,
  - wherein the two-way communication comprises receiving signals containing content associated with a source of content and transmitting signals to an individual associated with that source of content;
- means for providing multiple distinct display regions for the display of content,
  - wherein, in response to a user command, two or more of the multiple distinct display regions are merged to form a merged display region for the display of content;
- means for storing associations between each source of content and at least one of the multiple distinct display regions,
  - wherein an association is created between one source of content and one of the multiple distinct display regions and/or between one source of content and the merged display region;
- means for analyzing received content to identify a source of the received content;
- means for determining the distinct display region and/or the merged display region associated with the identified source of the received content; and
- means for routing the received content to the determined distinct display region or the determined merged display region for display,
  - wherein, the received content is displayed automatically within the determined distinct display region and/or the determined merged display region associated with the identified source of the received content; and
  - in response to a user selection of the determined distinct display region or the determined merged display region displaying the received content, the routing means:
    - accesses the storage component to identify an individual associated with the identified source of the received content; and
    - initiates a two-way communication session with the identified individual through the two-way communication means.

17. The electronic display device of claim 16, wherein the received content includes at least one of a still image, a moving image, and text.

18. The electronic display device of claim 16, wherein the merged display region is further defined by all of the multiple distinct display regions on the means for providing multiple distinct display regions, and wherein the merged display region displays content associated with a single individual.

19. The electronic display device of claim 16, further comprising means for detecting a movement of the digital display device, wherein when the means for detecting a movement detects a movement, at least one association between a source of content and a distinct display region is changed.

* * * * *